(12) United States Patent
O'Neill

(10) Patent No.: US 8,189,530 B2
(45) Date of Patent: May 29, 2012

(54) METHODS AND APPARATUS FOR VPN SUPPORT IN MOBILITY MANAGEMENT

(75) Inventor: Alan O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 1814 days.

(21) Appl. No.: 10/918,091

(22) Filed: Aug. 13, 2004

(65) Prior Publication Data
US 2006/0034209 A1 Feb. 16, 2006

(51) Int. Cl.
*G08C 17/00* (2006.01)
*H04J 3/24* (2006.01)
*H04W 36/00* (2009.01)

(52) U.S. Cl. .................... 370/331; 370/338; 370/395.54; 370/474; 370/475; 455/436

(58) Field of Classification Search .................. 370/338, 370/351–356, 395.53, 389, 400, 401, 402, 370/310, 331, 349, 395.3, 395.31, 395.32, 370/395.54, 469, 474, 475; 709/224–227, 709/238, 242; 726/15, 16; 455/435.1, 466, 455/418, 432.1, 432.2, 435, 436–439, 445, 455/449
See application file for complete search history.

(56) References Cited

U.S. PATENT DOCUMENTS

| | | | |
|---|---|---|---|
| 6,445,922 B1 | 9/2002 | Hiller et al. | |
| 6,496,505 B2 | 12/2002 | La Porta et al. | |
| 6,519,254 B1 | 2/2003 | Chuah et al. | |
| 6,799,041 B1 | 9/2004 | Dressel et al. | |
| 6,865,613 B1 | 3/2005 | Millet et al. | |
| 6,942,538 B2 | 9/2005 | Stanier | |
| 7,039,035 B2 * | 5/2006 | Droms et al. | 370/338 |
| 7,301,957 B2 * | 11/2007 | Lee et al. | 370/432 |
| 7,382,778 B2 * | 6/2008 | Chari et al. | 370/392 |
| 7,430,174 B2 * | 9/2008 | Janneteau et al. | 370/238 |
| 2002/0009066 A1 | 1/2002 | Shimizu et al. | |
| 2002/0018456 A1* | 2/2002 | Kakemizu et al. | 370/338 |
| 2002/0026527 A1 | 2/2002 | Das et al. | |
| 2002/0191593 A1 | 12/2002 | O'Neill et al. | |
| 2003/0137961 A1 | 7/2003 | Tsirtsis et al. | |
| 2003/0176188 A1 | 9/2003 | O'Neill | |

(Continued)

FOREIGN PATENT DOCUMENTS
WO WO 02080605 A1 10/2002

(Continued)

OTHER PUBLICATIONS

C. Perkins, Editor "IP Mobility Support", Network Working Group, pp. 1-79 (Oct. 1996).

(Continued)

*Primary Examiner* — Habte Mered
(74) *Attorney, Agent, or Firm* — Raphael Freiwirth

(57) ABSTRACT

MIP forwarding methods are described that use additional access link-layer identifiers and redirecting data packet identifiers to provide unambiguous forwarding through the MIP Foreign Agent when the Mobile Node has multiple Home Addresses, and/or when the Home Agent, or some intermediate MIP node between the Foreign Agent and the Home Agent, supports multiple pools of home addresses from overlapping address spaces. New identifiers are used to ensure that sufficient forwarding information exists in conjunction with the information in transmitted packets, to uniquely identify each packet flow. Each packet flow is a globally unique quartet of the MN identity, the HA, the HA address pool and the HoA.

52 Claims, 9 Drawing Sheets

U.S. PATENT DOCUMENTS

| | | | |
|---|---|---|---|
| 2003/0182433 A1 | 9/2003 | Kulkarni et al. | |
| 2004/0047322 A1 | 3/2004 | O'Neill | |
| 2004/0047348 A1 | 3/2004 | O'Neill | |
| 2004/0092260 A1 | 5/2004 | Thubert et al. | |
| 2005/0088994 A1* | 4/2005 | Maenpaa et al. | 370/331 |
| 2005/0101321 A1* | 5/2005 | Ikeda et al. | 455/435.1 |
| 2005/0136924 A1* | 6/2005 | Adrangi et al. | 455/435.1 |
| 2006/0171370 A1* | 8/2006 | Matsumoto et al. | 370/351 |

FOREIGN PATENT DOCUMENTS

WO     WO 2004014027 A2     2/2004

OTHER PUBLICATIONS

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pgs. 1-1:4:12 (Mar. 1999).

Karagiannis, Mobile IP, State of the Art Report, pp. 1-63, Jul. 1999.

Elin Wedlund et al., "Mobility Support Using SIP", Proc. of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

International Search Report from International Application No. PCT/US2005/028483, dated Oct. 26, 2007;pp. 1-2.

Written Opinion of International Searching Authority from International Application No. PCT/US2005/028483; dated Oct. 26, 2007; pp. 1-4.

Kompella Juniper Networks K: "Layer 2 VPNs Over Tunnels"; draft-kompella-12vpn-12vpn-00.txt, IETF Standard-Working-Draft, Internet Engineering Task Force, IETF, CH, Jan. 1, 2004, XP015031105.

Supplementary European Search Report—EP05785441, Search Authority—Munich Patent Office, Aug. 24, 2011.

\* cited by examiner

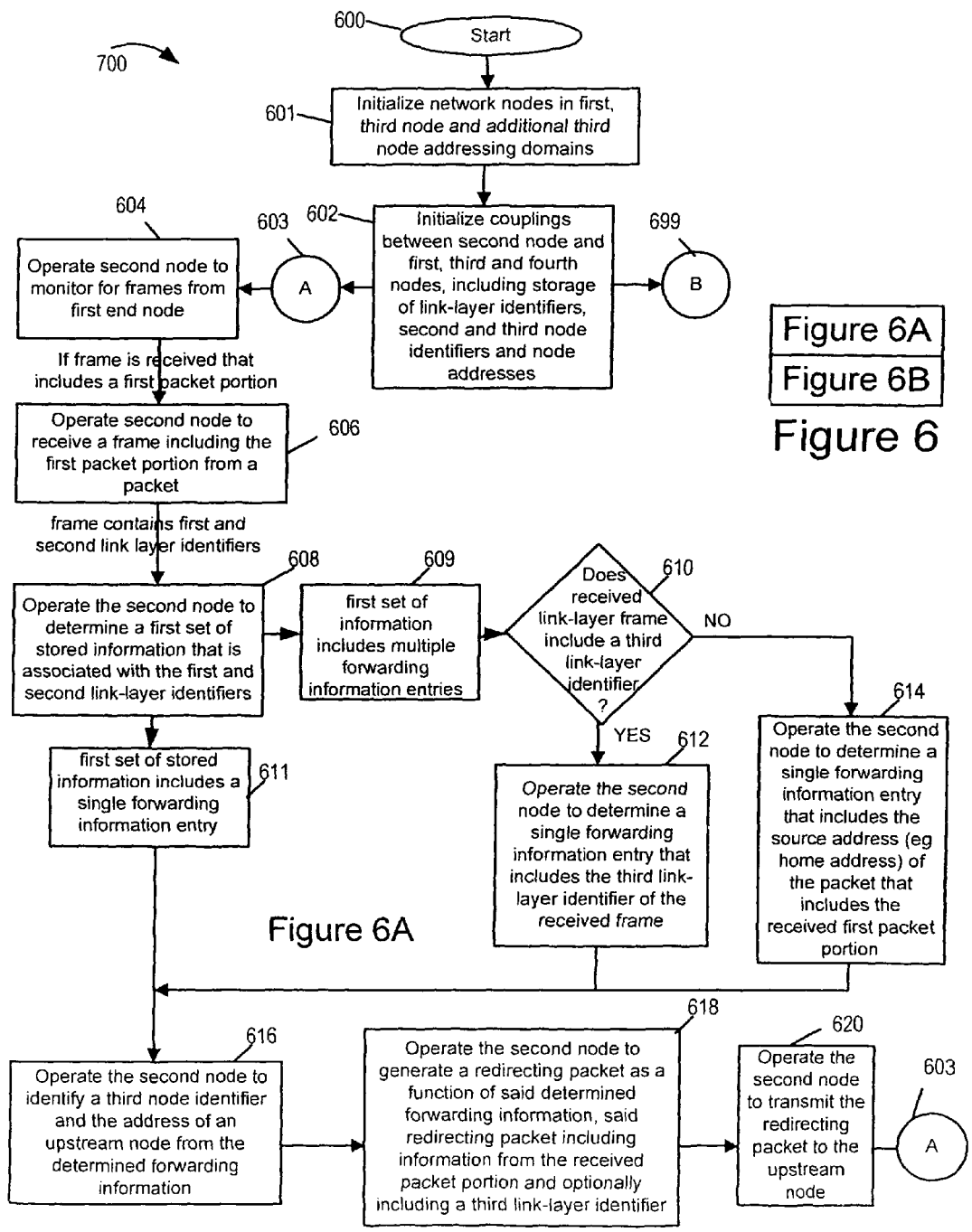

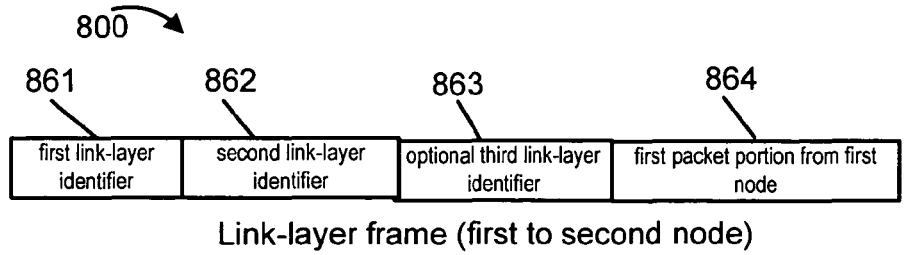
Link-layer frame (first to second node) Fig. 7
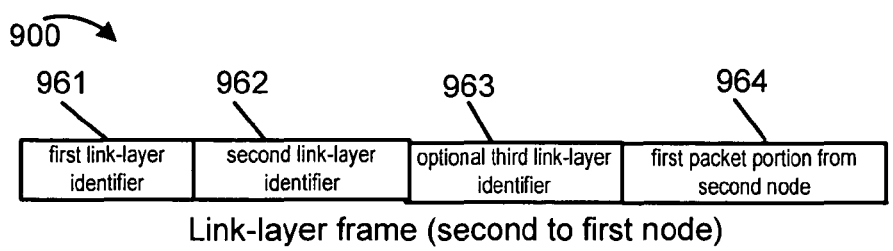
Link-layer frame (second to first node) Fig. 8
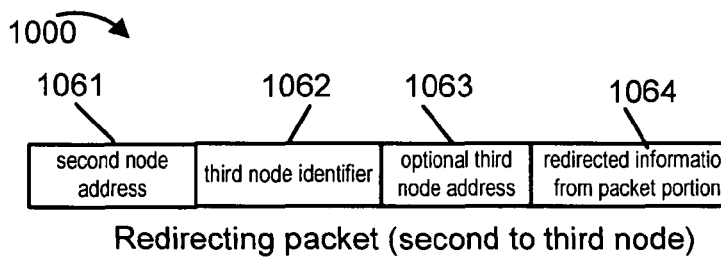
Redirecting packet (second to third node) Fig. 9
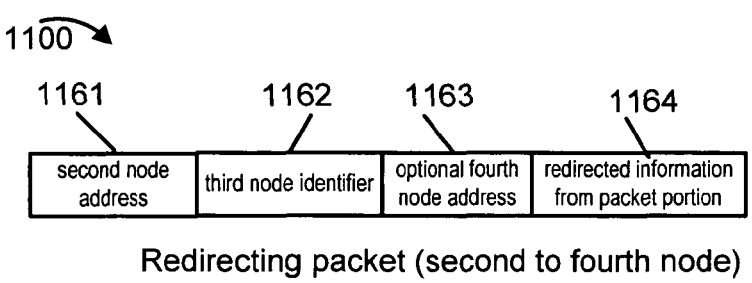
Redirecting packet (second to fourth node) Fig. 10
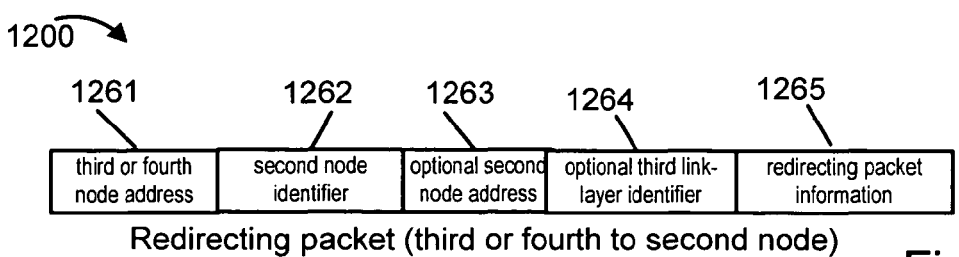
Redirecting packet (third or fourth to second node) Fig. 11

METHODS AND APPARATUS FOR VPN SUPPORT IN MOBILITY MANAGEMENT

FIELD OF THE INVENTION

The present invention relates generally to the field of mobility management in communication systems and more specifically to methods and apparatus for providing an alternative architecture that provides support for Virtual Private Network (VPN) forwarding for end nodes, e.g., Mobile Nodes in mobile systems.

BACKGROUND

Mobile IP (MIP) is described in a number of documents developed in the IETF (Internet Engineering Task Force) (www.ietf.org). MIP provides for mobility management for a Mobile Node (MN) Home address (HoA) by redirecting (e.g., tunneling) packets that are received at a Home Agent (HA), and that are directed from a Correspondent Node (CN) source address to a MN HoA, towards a MN Care of Address (CoA), at which the MN HoA is routable. Typically, the MN CoA is the address of the Foreign Agent (FA) within the Access Router to which the MN is directly attached, i.e., connected to without an intermediate node being present between the Access Router and MN Similarly, packets received at the FA from the MN, that are directed from the MN HoA to the CN, are redirected to the HA using a redirecting packet, where the redirected packet is retrieved from the redirecting packet and forwarded by standard Internet routing towards the CN destination address. MIP signaling between the MN and the HA, maintains the MN CoA/MN HoA binding at the HA and the FA, and updates it to each new CoA value as the MN moves between Access Routers (FAs), and hence across the routing topology. The HA issues routing adverts for HoA prefixes at that HA, and MNs are allocated HoAs from said advertised prefixes to ensure that packets address towards the MN HoA are forwarded via the HA.

The known MIP FA is typically separated from the MN by a single link which may be a fixed or wireless link, with each MN on a single FA having a unique link-layer address. The identity of a MN, that sends an upstream packet to the FA, is typically known by the link-layer source address of link-layer frames that carry the packet over the access link. The FA then forwards packets by comparing the source address of the packet to the HoAs stored in mobility bindings within the FA for that identified MN. The FA then determines, from the matching mobility binding, the address of the associated MIP HA to which the received packet should be redirected. When downstream redirecting packets are received from the HA and the redirected packet is recovered, then the MN receiver is identified at the FA using the combination of the HA source address of the redirecting packet (the HA address) and the destination address of the redirected packet (the MN HoA). These addresses identify a unique mobility binding at the FA, from which the link-layer identity of the MN can be determined so that the packet can be forwarded in link-layer frames to that MN.

When the MN has multiple HoAs from one or more HAs then the link-layer and packet information received at the FA may not uniquely identify the HA that is associated with the HoA source address of the upstream packet, due to the MN having multiple HoAs from overlapping address spaces. Additional information needs to be received at the FA with each packet to enable the FA to discriminate between the multiple binding entries that contain the same HoA value. Additionally, downstream packet information that is received at the FA may not be able to uniquely identify the MN receiver if the combination of the HA address and the HoA address is not unique at the FA because, for example, multiple different HAs employ the same HA address and the same HoA address prefix.

In addition, when a regional MIP node exists between the FA and the HA, and upstream packets are directed through, and switched by, that regional MIP node, then the FA needs to provide information in the redirecting packet to enable the regional MIP node to be able to forward the packet to the correct upstream HA that is associated with the HoA in the source address of the packet. The HoA value itself is not sufficient because once again the HoA from different HAs can reuse the same value leading to forwarding ambiguity at the regional MIP node. Similarly, downstream packets received at the FA are now forwarded using the combination of the regional MIP node address in the redirecting packet and the HoA in the redirected packet, but this combination is again not necessarily unique even if the HoA/HA address combination is unique, because the HA address has been lost from the redirecting packet through the regional MIP node.

Similarly in some cases, a specific problem further occurs with multicast packets that are forwarded from the HA to the FA and onto the MN because the destination address of the packet for the access link is a multicast address. This multicast address has to be hidden in standard MIP forwarding by using an encapsulating tunnel that includes the HoA as the destination address so that the target MN can be identified and reached. This additional encapsulation is inefficient over the access link and should ideally be avoided, but its removal creates forwarding ambiguity at the FA and demultiplexing ambiguity at the MN (e.g. with which (MN,HA,HoA is this multicast content associated).

One prior art technique uses a composite packet that is received at the FA for the specific case that the MN and FA are separated by an inter-working function (IWF) to resolve forwarding ambiguities due to the loss of the MN specific link-layer identifier between the IWF and the FA, that exists between the MN and the IWF. The composite packet contains both the upstream packet and the Network Access Identifier (NAI) of the MN sender, the NAI identifying the username@domain of the MN (or some other unique MN identifier) so that the FA can determine the MN and its set of mobility bindings for forwarding purposes. Similarly, downstream packets are matched to a unique mobility binding to identify the MN, and then the composite packet is formed so that the IwF can map the NAI in the composite packet into the MN specific link-layer identifier that exists between the IWF and the MN for forwarding purposes.

This technique does not however provide support for resolving the ambiguities in the downstream forwarding/de-multiplexing for redirecting packets received at the FA and the MN, nor for upstream packets when the MN has multiple HoAs from different HAs for the same NAI (or equivalent composite packet information). In addition, the NAI is also a very large identifier and basing forwarding in the FA on IP layer information such as the HoA and the NAI is less efficient than using link-layer identifiers, as exemplified by Multi-Protocol Label Switching (MPLS) systems.

In view of the above discussion, it should be apparent that there is a need for improved methods of forwarding packets in mobility networks to remove the forwarding ambiguities associated with multiple HoAs from multiple HAs for each MN.

SUMMARY

The present invention is directed to methods and apparatus for providing an alternative MIP forwarding architecture that employs Virtual Private Network techniques to uniquely determine the upstream and downstream packet flows associated with each packet received at the MN and the FA.

A new HA specific link-layer identifier, referred to as the second link-layer identifier, is first defined for the access link, in accordance with aspects of the invention, which provides a unique identifier for at least each HA with which the MN has a mobility binding. This enables the FA to efficiently identify the target HA address for a received upstream packet, and the MN to identify the HA associated with the HoA in the received downstream packet, such that in both cases the (HA, HoA) pair is known. When a single HA has multiple HoA pools, referred to as address domains at the HA that overlap, such that the single HA is supporting a virtual HA per HoA pool. The HA specific link-layer identifier can then be used to uniquely identify the virtual HA as a (HA, HoA pool) pair so that either a virtual HA specific address or a HA specific address plus a virtual HA VPN identifier, can be identified at the FA. The HA specific link-layer identifier can be included within the link-layer frame header, within the link-layer frame payload but outside of the packet portion also contained in the frame payload, or within the packet portion itself. This identifier can be included in all link-layer frames, can be included in a single (i.e. first) link-layer frame or even distributed across multiple frames that are associated with a specific packet, such that the remaining frames for the same packet implicitly reuse the same link-layer value.

A new HoA specific link-layer identifier, referred to as the third link layer identifier, is next defined for the access link, in accordance with aspects of the invention, which provides a unique link-layer identifier for each HoA flow associated with a specific mobility binding among multiple such bindings from an addressing domain of the HA. This identifier can be included within the link-layer frame header, within the link-layer frame payload but outside of the packet portion also contained in the frame payload, or within the packet portion itself. This identifier can be included in all link-layer frames, can be included in a single (i.e. first) link-layer frame or even distributed across multiple frames that are associated with a specific packet, such that the remaining frames for the same packet implicitly reuse the same link-layer value. This link-layer identifier can also be omitted if the FA and MN are able to determine the HoA from the received packet, but this is specifically not possible for the MN when the packet from the FA towards the MN has a multicast destination address.

The HA and HoA specific link-layer identifiers can be combined, in various aspects of the invention, into a single link-layer parameter, and either or both of these identifiers can be combined with the MN specific link-layer identifier. Any of the three identifiers can be omitted for efficiency reasons and can be used along with information included in the received packet, provided that the FA and MN is in a position to uniquely identify a mobility binding that is associated with the (MN, HA, HoA pool, HoA) quartet. Restating, each additional link-layer parameter may be omitted from packets traversing the access link if no ambiguity is created given the present mobility bindings stored at the MN and the FA.

The HA specific link-layer identifier can be re-used, in various aspects of the invention, across multiple MN specific link-layer identifiers such that the FA forwarding is based simply on the value of the HA link-layer identifier. This reduces the number of uplink forwarding entries to the number of active HAs or active HoA pools rather than the number of active MNs.

Exemplary Virtual HA (VHA) identifiers, referred to as the second and third node identifiers, in accordance with aspects of the invention, is next defined for inclusion in packets that are sent between the HA and the FA. The VHA identifier is used to distinguish between multiple packet flows that exist between the FA and the same HA address. When the HA has multiple overlapping HoA pools then the VHA identifier can be used to identify one specific HoA pool at the HA. The VHA identifier can alternatively be used to identify a specific (HoA pool, HoA) pair or even a specific (MN, HoA prefix, HoA) triplet at the FA and the HA. Further, the VHA identifier can include information that is also contained in the MN specific, HA and HoA link-layer identifiers so that the FA can automatically generate one or more portions of one or more of these link-layer identifiers from the received downstream VHA identifier, and automatically generate the VHA identifier from the received upstream link-layer identifiers.

BRIEF DESCRIPTION OF THE FIGURES

FIGS. 7, 8, 9, 10, and 11 illustrate exemplary messages in accordance with the present invention.

DETAILED DESCRIPTION OF INVENTION

Figure 1A:
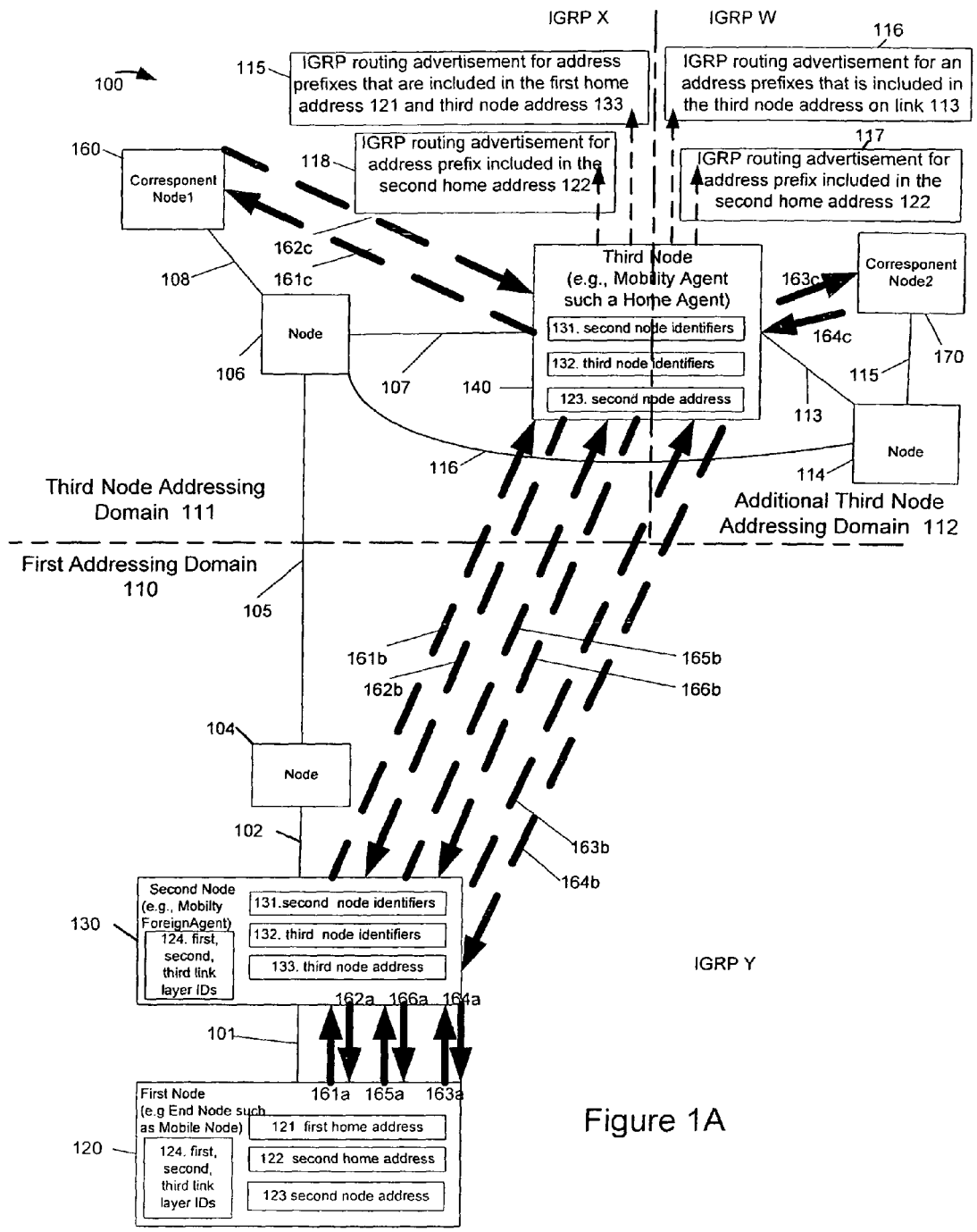
FIG. 1A is an illustration of an exemplary system, implemented in accordance with the present invention and using methods of the present invention.
Figure 1B:
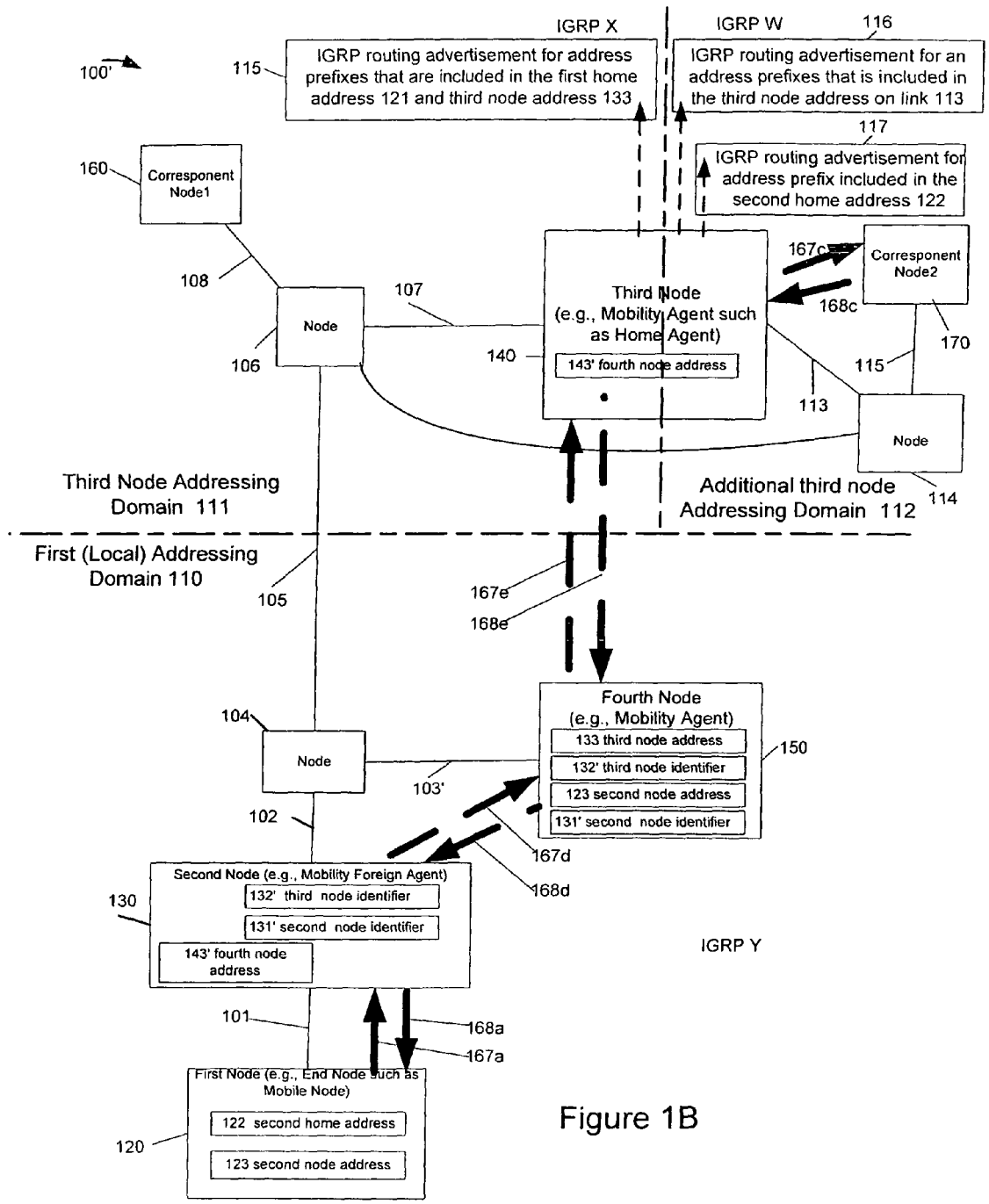
FIG. 1B is an illustration of an extended exemplary system, implemented in accordance with the present invention and using methods of the present invention.

FIG. 1A shows an exemplary basic system 100 implemented in accordance with the present invention and using methods of the present invention. FIG. 1B shows an exemplary extended system 100' implemented in accordance with the present invention and using additional methods of the present invention.

System 100 of FIG. 1A includes a first addressing domain 110 including nodes that execute an Interior Gateway Routing Protocol (IGRP) Y to advertise the location of, and routes for, first domain addresses, a third node addressing domain 111 including nodes executing an Interior Gateway Routing Protocol X to advertise the location of, and routes for, third node domain addresses, and an additional third node addressing domain 112 including nodes executing an Interior Gateway Routing Protocol W to advertise the location of, and routes for, additional third node domain addresses. Each Interior gateway Routing Protocol X,Y,W further advertises routes for addresses that are outside of its addressing domain.

For example, protocol X has routes to reach addresses in the first addressing domain 110 and protocol Y has a route to reach at least the third node address 133. Without loss of generality, the first addressing domain 110 and the third node addressing domain 111 may or may not employ overlapping address spaces, and the third node addressing domain 111 and the additional third node addressing domain 112 may or may not employ overlapping address spaces. In some implementations, some of the addresses in the third node addressing domain 111 and the additional third node addressing domain 112 are overlapping, e.g., employ the same address values from two different private address spaces, whilst some of the addresses in the first addressing domain 110 and some of the addresses in the third node addressing domain 111 are non-overlapping, e.g., from public address space or a common private address space. In some implementations, the third node addressing domain 111 and the first addressing domain 110 are under a common administration such as a wholesale network operator with IGRP X and IGRP Y being part of the same routing protocol, whilst the additional third node addressing domain 112 is under a different administration such as an external Retail Internet Service Provider (ISP).

The first addressing domain 110 includes a first node, e.g., an end node such as a mobile node (MN), 120 directly coupled to a second node, e.g., a mobility agent, 130 by an access link 101, e.g., a wireless access link or a wire access link. Since the MN is directly coupled to the second node, there is no intermediate node between the MN and second node. The second node 130 is coupled to a network node 104 via link 102, and network node 104 is further coupled to a network node 106 in the third node addressing domain 111. The third node addressing domain 111 further includes a first correspondent node (CN1) 160 and one interface of a third node, e.g., a mobility agent, 140, both of which are coupled to network node 106 via links 108 and 107 respectively. The third node 140 also has an interface in the additional third node addressing domain 112 that is coupled to a second correspondent node (CN2) 170 by links 113 and 115 via network node 114, and network node 114 is further coupled to network node 106 via link 116. For the purposes of the description of the invention, CN1 160 and CN2 170 employ globally unique addresses and IGRP X and IGRP W includes routes that enable packets to be directed between CN1 160 and CN2 170 that do not traverse the third node 140 and instead traverse link 116.

The third node 140 has one or more allocated address prefixes corresponding to the third node addressing domain 111 that are included in a routing advertisement 115 that is transmitted by the third node 140 into the IGRP part X of the third node addressing domain 111. For the purposes of the invention description, each of the other nodes in the routing system are considered to re-transmit said router advertisement for said address prefixes as the address prefixes are not allocated to those nodes. One of these address prefixes is included in a first home address 121 which is allocated to the first node 120 and one of the address prefixes is included in the third node address 133 that is stored in the second node 130. The third node 140 has one or more address prefixes from the additional third node addressing domain 112 that are included in a routing advertisement 116 transmitted by the third node 140 into the IGRP part W of the additional third node addressing domain 112. One of these address prefixes is included in the interface address of the third node that is coupled to link 113. The third node 140 further issues an IGRP routing advertisement which includes an address prefix which is included in a second home address 122 which may additionally be allocated to the first node 120. When the second home address 122 is associated with the additional third node addressing domain 112 then IGRP advertisement 117 is transmitted into the additional third node addressing domain 112 via IGRP W. Alternatively, when the second home address 122 is associated with the third node addressing domain 111 then IGRP advertisement 118 is transmitted into the third node addressing domain 111 via IGRP X.

The second node 130 has a second node address 123 from the first addressing domain 110 which is stored in the third node 140 and the first node 120 to support packet forwarding. The first and the second node 120,130 further include first, second and third link-layer identifiers 124 that are used to support link-layer frame and network layer packet forwarding across the access link 101 as will now be explained. The second node 130 and the third node 140 further include second node identifiers 131 and third node identifiers 132 which are further used to support packet forwarding between the second and third nodes 130,140 as will subsequently be explained.

Packet flow 161, including packet flows 161*a*, 161*b* and 161*c*, is used to direct upstream packets that have a source address equal to the first home address 121, and a destination address equal to the address of CN1 160 via the third node 140. Packet flow 161*a* comprises packets sent over the access link 101 to the second node 130, where the received packets are redirected to the third node 140 using the redirecting packets in flow 161*b*. Redirecting packets can for example be created by IP in IP encapsulation of the packets in flow 161*a*. At the third node 140, the redirecting packets are converted back to into a redirected packet flow 161*c*, which is the similar to the packets in flow 161*a*, and flow 161*c* is forwarded via link 107, node 106, and link 108 to CN1 160. Packet flow 162, including packet flows 162*a*, 162*b*, and 162*c*, is used to direct downstream packets that have a destination address equal to the first home address 121, and a source address equal to the address of CN1 160 via the third node 140. At the third node 140, the packets in flow 162*c* are received and redirected to the second node 130 using redirecting packet flow 162*b*. At the second node 130, the redirecting packet flow 162*b* is converted into the redirected packet flow 162*a*. Packet flow 162*a* is then transmitted sent over the access link 101 from the second node 130 to the first node 120.

When the second home address 122 of the first node 120 is an address from the additional third node addressing domain 112, such that IGRP advertisement 117 is transmitted into IGRP W, then packet flows 163, including packet flows 163*a*, 163*b*, and 163*c*, are similarly used to direct upstream packets that have a source address equal to the second home address 122, and a destination address equal to the address of CN2 170 via the third node 140 and the third node interface on link 113, whilst packet flow 164, including packet flows 164*a*, 164*b*, and 164*c*, is similarly used to direct packets that have a destination address equal to the second home address 122, and a source address equal to the address of CN2 170 via the link 113 and third node 140.

Therefore it can be seen that packet flows 161*a* and 163*a* and are both packet flows from the first node 120 to the second node 130, and packet flows 161*b* and 163*b* are both redirecting flows from the second node 130 to the third node 140. It is possible that the destination addresses of CN1 160 and CN2 170 and/or the first and second home addresses 121, 122 have the same value as they are from different addressing domains 111, 112 that may have overlapping address spaces, and therefore neither the second node 130 nor the third node 140 may not be able to uniquely distinguish between packets in flows 161*a*, 161*b* from those in packets in flows 163*a*, 163*b*. Alternatively, the second node 130 and third node 140 may be designed to more efficiently forward packets in flows 161a, 163a, 161b, 163b without having to inspect the first and second home addresses 121, 122 or the CN1 160, CN2 170 addresses. According to the invention, novel identifiers are associated with each of the packet flows 161a, 161b and 163a, 163b that indicate which one of either the third node addressing domain 111 and the additional third node addressing domain 112 is associated with the packet flow, such that the combination of these identifiers with the redirecting packet information uniquely identifies the forwarding information for each flow in the second and third nodes 130,140.

Further it can be seen that packet flows 162a and 164a and are both packet flows to the first node 120 from the second node 130, and packet flows 162b and 164b are both redirecting flows to the second node 130 from the third node 140. It is possible that the destination addresses that are the first and second home addresses 121, 122 have the same value as they are from different addressing domains 111, 112 that may have overlapping address spaces, and therefore neither the first node 120 nor the second node 130 may not be able to uniquely distinguish between packets in flows 162a, 162b from those in packets in flows 164a, 164b. Alternatively, the second node 130 and first node 120 may be designed to more efficiently forward and demultiplex packets in flows 162a, 164a, 162b, 164b without having to inspect the first and second home addresses 121, 122 or the CN1 160, CN2 170 addresses. According to the invention, novel identifiers are associated with each of the packet flows 162a, 162b and 164a, 164b that indicate which one of either the third node addressing domain 111 and the additional third node addressing domain 112 is associated with the packet flow, such that the combination of these identifiers with the redirecting packet information uniquely identifies the forwarding/demultiplexing information for each flow.

Prior art access links include a first link-layer identifier that uniquely identifies the first node 120 to the second node 130 for supporting the forwarding of link-layer frames that contain portions of packets sent from or received by the first node 120. According to the invention, a second novel link-layer identifier is included in such link-layer frames that uniquely identifies the third node 140 and the addressing domain at that third node 140 to the second node 120. The second node 130 uses the second link-layer identifier to determine forwarding information for the received packet portions contained in such link-layer frames, so that the redirecting flow is transmitted towards the identified third node 140. If that third node 140 only supports a single interface into a single addressing domain then forwarding at the third node 140 may be implemented as in systems using prior art redirecting packet information that includes the third node address. However, when the third node 140 contains multiple interfaces into a single addressing domain, or multiple addressing domains, then the forwarding at the third node 140 is potentially ambiguous.

Therefore, in a further inventive step, the determined forwarding information in the second node 130 further identifies the forwarding interface and/or the addressing domain at the third node 140 such as one of the third node addressing domain 111 via the interface on link 107, and the additional third node addressing domain 112 via the interface on link 113. According to the invention, the determined third node 140, as well as one of the addressing domains at the third node 140 (such as third node addressing domain 111,) and an interface at the third node 140, are indicated in the redirecting packet flow 161b, 163b by the inclusion of a novel third node identifier. In one exemplary implementation, the third node identifier is an address of the third node 140 that is unique to one of the interfaces, the interface for link 107 or the interface for link 113, and the addressing domain (111, 112) such that the destination address of the redirecting packet received at the third node 140 uniquely identifies the forwarding for the redirected packet. In a second exemplary implementation, the third node identifier is a multiplexing identifier within the redirecting packet that identifies one of the interface and the addressing domain at the third node for the redirected packet. The third node identifier is in addition to the destination address of the redirecting packet, said destination address being a third node address that is common to either more than one interface, or more than one addressing domain, at the third node 140. This multiplexing identifier can be for example, a multiplexing field within an IP encapsulation technique such as a Generic Router Encapsulation (GRE) key field, an IP Security, Security Parameter Index (IPSEC SPI) value, a Transmission Control Protocol (TCP) or User Datagram Protocol (UDP) port number in a transport level encapsulation, an Internet Protocol Version 6 (IPv6) flow label identifier, an IPv6 extension header such as a routing header, an Layer 2 Tunneling Protocol (L2TP) channel number. Alternatively, the third node identifier can be associated with a switching layer between the second node 130 and the third node 140 such as a Multi Protocol Label Switching (MPLS) Label Switched Path (LSP) (with an MPLS label on each link of the switching layer) or an Asynchronous Transfer Mode (ATM) virtual circuit or virtual path number.

The inventive steps of using the second link-layer identifier at the second node 130, and the third node identifier at the third node 140, for forwarding packets addressed between the first node 120 first home address 121 and the CN1 160, ensures that the packets can be uniquely distinguished from packets sent from the second home address 122 to the CN2 170, or from any other flow that traverses the second and third nodes 130,140, without having to inspect the home address value, or requiring the home address and/or the third node address and/or the CN1/2 addresses to be globally unique. However, if the first node 120 has multiple home addresses from one of the same interface and the addressing domain of the third node 140, then the second link-layer identifier and the third node identifier will provide information so that the packets can be correctly forwarded, but the second and third nodes 130, 140 will not be able to discriminate between the two packet flows for policy or accounting processes.

Returning to FIG. 1A, this situation arises when the second home address 122 includes a prefix which is included in IGRP advert 118 into the third node addressing domain 111 and the second link-layer identifier associated with the second home address in the second node 130 is associated with a third node identifier that identifies the third node addressing domain 111 or more specifically the interface on link 107. Similarly, the first home address 121 is also associated with a third node identifier that identifies the third node addressing domain 111 and the interface on link 107. Lets then assume that the packet flow 165a from the second home address 122 is also directed to the CN1 160 such that the policy and accounting processes cannot distinguish between these flows 161a, 165a based on the CN1 160 address. Then, in an additional novel step, the packet flow 161a further includes a third link-layer identifier that is uniquely associated with the first and the second link-layer identifier and is used to indicate that packet flow 161a is associated with the first home address 121 of the first node 120. Packet flow 165a associated with the second home address 122 of the first node 120, that is therefore not part of packet flow 161a, would then include a different value for the third link-layer identifier, and the two flows 161a, 165a can then be distinguished at the second node 130 by the value of the third link-layer identifier that is included in link-layer frames received from the first node 120. Further, the third node identifier that is employed for the redirecting packet flow 161*b* that is associated with the first home address 121 optionally includes a portion that indicates to the third node 140 that packet flow 161*b* is for the first home address 121, whilst the packet flow 165*b* associated with the second home address 122 includes a different portion such that the third node identifiers for the two packet flows 161*b*, 165*b* are different, even though the flows are both associated with home addresses from the same third node addressing domain 111 and that are forwarded via the same third node interface on link 107. In an alternative implementation, the third link-layer identifier can be included in the redirecting packet from the second node 130 to the third node 140 in addition to the third node identifier, such that the third node identifier is then the same value for both the flow 161*b* associated with the first home address 121 and the flow 165*b* associated with the second home address 122. The invention alternatively includes the second node 130 and the third node 140 using the home address value in the received packets to distinguish between the packet flows 161*a*, 165*a* and 16 1*b*, 165*b* when the second link-layer identifier and the third node identifier of the invention are employed for packet forwarding.

The invention further provides equivalent identifiers and methods for distinguishing downstream packet flows as is now described.

According to the invention, the second novel link-layer identifier, that uniquely identifies the third node 140 and the addressing domain at that third node 140 to the second node 130, is included in link-layer frames from the second node 130 to the first node 120. The second node 130 identifies the second link-layer identifier from forwarding information that is determined from a novel second node identifier that is included by the third node 140 in the downstream redirecting flow sent to the second node 130. The second node identifier uniquely identifies the incoming interface and/or the addressing domain at the third node 140 such as one of the third node addressing domain 111 via the interface on link 107, and the additional third node addressing domain 112 via the interface on link 113. In one exemplary implementation, the second node identifier is an address of the second node 140 that is unique to one of the interface link (107 or 113) and the addressing domain (111, 112) at the third node 140. In an alternative exemplary implementation, the second node identifier is the same as the third node identifier that is employed for the corresponding upstream packet flow such that packet flows 161*b*, 162*b* and 163*b*, 164*b* include the same identifier value.

The inventive steps of using the second link-layer identifier at the second node 130, and the second node identifier at the third node 140, for forwarding downstream packets addressed to the first node 120 first home address 121 from the CN1 160, ensures that the packets can be uniquely distinguished from packets sent to the second home address 122 from the CN2 170, or from any other flow that traverses the second and third nodes 130, 140, without having to inspect the home address value, or requiring the home address and/or the third node address and/or the CN1/2 addresses to be globally unique. However, if the first node 120 has multiple home addresses from one of the same interface and the addressing domain of the third node 140, then the second link-layer identifier and the second node identifier will include information so that the packets can be correctly forwarded to the first node 120, but the second and third nodes 130, 140 will not be able to discriminate between the two packet flows for policy or accounting processes. In addition, the first node 120 cannot demultiplex the flows 162*a*, 166*a* at the link-layer (e.g., in a modem interface unit) without examining the value of the home address at the IP layer, and when the downstream packets have multicast destination addresses, then the home addresses are not even present in the downstream packets. Therefore, in an additional novel step, the packet flow 162*a* further includes a third link-layer identifier that is uniquely associated with the first and the second link-layer identifier and is used to indicate that packet flow 162*a* is associated with the first home address 121 of the first node 120. Packet flow 166*a* associated with the second home address 122 of the first node 120, that is therefore not part of packet flow 162*a*, would then include a different value for the third link-layer identifier, and the two flows 162*a*, 166*a* can then be distinguished in the link-layer at the first node 120 by the value of the third link-layer identifier that is included in link-layer frames received from the second node 130. Further, the second node identifier that is employed for the redirecting packet flow 162*b* that is associated with the first home address optionally includes a portion that indicates to the second node 130 that packet flow 162*b* is for the first home address 121, whilst the packet flow 166*b* associated with the second home address 122 includes a different portion such that the second node identifiers for the two packet flows 162*b*, 166*b* are different, even though the flows are both associated with home addresses from the same third node addressing domain 111 and that are forwarded via the same third node interface on link 107. In an alternative implementation, the third link-layer identifier can be included in the redirecting packet from the third node 140 to the second node 120 in addition to the second node identifier, such that the second node identifier is then the same value for both the flow 162*b* associated with the first home address 121 and the flow 166*b* associated with the second home address 122. The invention alternatively includes the first node 120 and the second node 130 using the home address value in the received packets to distinguish between the packet flows 162*a*, 166*a* and 162*b*, 166*b* when the second link-layer identifier and the second node identifier of the invention are employed for packet forwarding.

FIG. 1B illustrates an extended exemplary system 100', implemented in accordance with the present invention and using methods of the present invention, that can be used in conjunction with the various packet flows and forwarding operations described in FIG. 1A. The extended system 100' includes the elements and features of system 100 which have been previously described with respect to FIG. 1A. The extended system 100' includes, in the first addressing domain 110, a fourth node 150 with at least one fourth node address from that first addressing domain 110. The fourth node 150, e.g., a mobility agent, is coupled to node 104 via link 103'. The exemplary packet flows and additional described elements shown in FIG. 1B have been included for further explaining various features of the invention not previously described in FIG. 1A. The third node 140 stores the fourth node address 143' to support redirecting packet flows 167*e* and 168*e* between the third node 140 and the fourth node 150 that are associated with the second home address 122 of the first node 120 (e.g., similar flows to flow 163 and 164 in FIG. 1A). The second node 130 similarly stores the fourth node address 143' to support redirecting packet flows 167*d* and 168*d* between the second node 130 and the fourth node 150. The fourth node 150 stores the third node address 133 and the second node address 123 in support of said packet flows with the second and third nodes 130,140. As has been described in association with FIG. 1A, upstream packet flow 163 and downstream packet flow 164 are associated with the second home address 122 of the first node 120 when the second home address 122 is from the additional third node addressing domain 112. Similarly in association with FIG. 1B, upstream packet flow 167 and downstream packet flow 168 are associated with the second home address 122 of the first node 120 when the second home address 122 is from the additional third addressing domain 112. As has also been described for FIG. 1A similarly with respect to FIG. 1B, the invention defines novel second and third node identifiers (131', 132') that are used to associate a redirecting packet flow (167b, 168b) between the second node 120 and the third node 140, with the interface and addressing domain of the third node 140 that is associated with forwarding for that packet flow, and novel second and third link-layer identifiers that associate the packet flows 167a, 168a over the access link 101 with the address of the third node 140 and the second and third node identifiers (131', 132') associated with the flows 167b, 168b that are exchanged with the third node 140.

The fourth node 150 enables a number of nodes similar to the third node 140, and associated addressing domains, to be reached from the second node 130, without the second node having to manage communications state for each of said nodes similar to the third node 140. In a first exemplary embodiment of the invention, the second link-layer identifier uniquely identifies a forwarding entry in the second node 130 that is associated with the third node identifier 132'. The third node identifier 132' is included in upstream packet flow 167d to the fourth node 150 and can either be an address of the fourth node that is specific to the third node 140 or a multiplexing identifier that selects a forwarding entry in the fourth node 150 that is associated with the second home address 122 from the additional third node addressing domain 112 at the third node 140. The fourth node 150 also has the third node identifier 132' in a forwarding entry that is associated with the interface and addressing domain of the third node 140 for the second home address (link 113 in the additional third node addressing domain 112), such that the forwarding information includes new information that is not received in the redirecting packet flow 167d. Packet flow 167a is therefore mapped to the third node identifier associated with the second link-layer identifier, and forwarded to the fourth node 150, where the third node identifier 132' indicates a unique forwarding entry and new packet flow information for the packet flow to the third node 140 as flow 167e. In an alternative embodiment, the third node identifier can include the information used by the fourth node 150 to create the redirecting packets in flow 167e and hence the fourth node 150 forwarding process involves mapping the redirecting information in the flow 167d into the flow 167e.

Similarly, the second node identifier 131' in the fourth node 150 is included in a forwarding entry that is employed for packet flows 168e arriving from the third node 140 via the interface on link 113 in the additional third node addressing domain 112. This second node identifier 131' is then mapped within the forwarding entry in the second node 130 into the second link-layer identifier to be used over the access link 101 in link-layer frames so that the first node 120 can determine that the received packet flow 168a is associated with the additional third node addressing domain 112. If the first node 120 has multiple home addresses from the additional third node addressing domain 112, then the packet flows and forwarding entries can optionally include information for the third link-layer identifiers that are used over the access link 101 and in some embodiments in the redirecting flows 167d, 168d, 167e, 168e.

FIG. 7 illustrates exemplary upstream (first to second node) link level frame contents 800 included in frames, between the first node 120 and the second node 130, associated with the novel packet flows and forwarding operations of the invention. In part 864 the frame includes a packet portion from a packet that is being transmitted from the first node 120 to the second node 130. In part 861, the frame includes a first link-layer identifier that uniquely identifies the first node 120 to the second node 130 amongst each of the other directly coupled nodes, such that the sender of the link-layer frame can be determined at the second node 130. Part 862 includes a second link-layer identifier that associates the packet portion in part 864 with a first set of stored information in the second node 130 that is used for forwarding packets between the second node 130 and a specific interface and/or addressing domain at the third node 140, optionally via a fourth node 150. Optional part 863 includes a third link-layer identifier that discriminates between multiple forwarding entries in the first set of stored information, with each value of the third link-layer identifier being associated with one of said multiple forwarding entries, and each of said multiple forwarding entries being further associated with a different home address of the first node 120.

FIG. 8 illustrates exemplary downstream (second to first node) link-level frame contents 900 included in frames, between the second node 130 and the first node 120, associated with the novel packet flows and forwarding operations of the invention. Part 964 of the frame includes a packet portion from a packet that is being transmitted to the first node 120 from the second node 130. In part 961, the frame includes a first link-layer identifier that uniquely identifies the first node 120 to the second node 130 amongst each of the other directly coupled nodes, such that the receiver of the link-layer frame can be determined at the second node 130. Part 962 includes a second link-layer identifier that associates the packet portion in part 964 with a first set of stored information in the second node 130 that is used for forwarding packets between a specific interface and/or addressing domain at the third node 140, optionally via a fourth node 150, to the first node 120. Optional Part 963 includes a third link-layer identifier that discriminates between multiple demultiplexing entries in the link-layer at the first node 120, with each value of the third link-layer identifier being associated with a different home address of the first node 120 that is further associated with the interface and/or addressing domain of the third node 140.

FIG. 9 shows an exemplary redirecting packet 1000 that is transmitted from the second node 130 to the third node 140. Part 1064 includes information from a packet portion that was received at the second node 130, and which is being redirected to the third node 140. Part 1061 includes the second node address as the source address of the redirecting packet. Part 1062 includes the third node identifier that identifies the interface and/or addressing domain at the third node 140 with which the redirected packet information is associated for forwarding purposes. Part 1062 may optionally include the destination address of the third node, which alternatively may be included in an optional part 1063.

FIG. 10 shows an exemplary redirecting packet 1100 that is transmitted from the second node 130 to the fourth node 150. Part 1164 includes information from a packet portion that was received at the second node 130, and which is being redirected to the third node 140. Part 1161 includes the second node address as the source address of the redirecting packet. Part 1162 includes the third node identifier that identifies the interface and/or addressing domain of the third node 140, to the fourth node 150, with which the redirected packet information is associated for forwarding purposes. Part 1162 may optionally include the destination address of the fourth node. If the fourth node address is not included in part 1162 then the fourth node address is included in optional part 1163.

FIG. 11 shows an exemplary redirecting packet 1200 that is transmitted from the third node 140 or the fourth node 150 to the second node 130. Part 1265 includes information from a packet portion that was received at the third node 140, and which is being redirected to the second node 120. Part 1261 includes the third or fourth node address as the source address of the redirecting packet. Part 1262 includes the second node identifier that identifies the interface and/or addressing domain at the third node 140 with which the redirected packet information is associated for forwarding purposes at the second node 130. Part 1262 may optionally include the destination address of the second node 130, which alternatively may be included in an optional part 1263. Part 1264 includes an optional third link-layer identifier that selects between multiple forwarding entries that are associated with multiple home addresses of the first node 120, within the first set of information stored at the second node 130.

Figure 2:
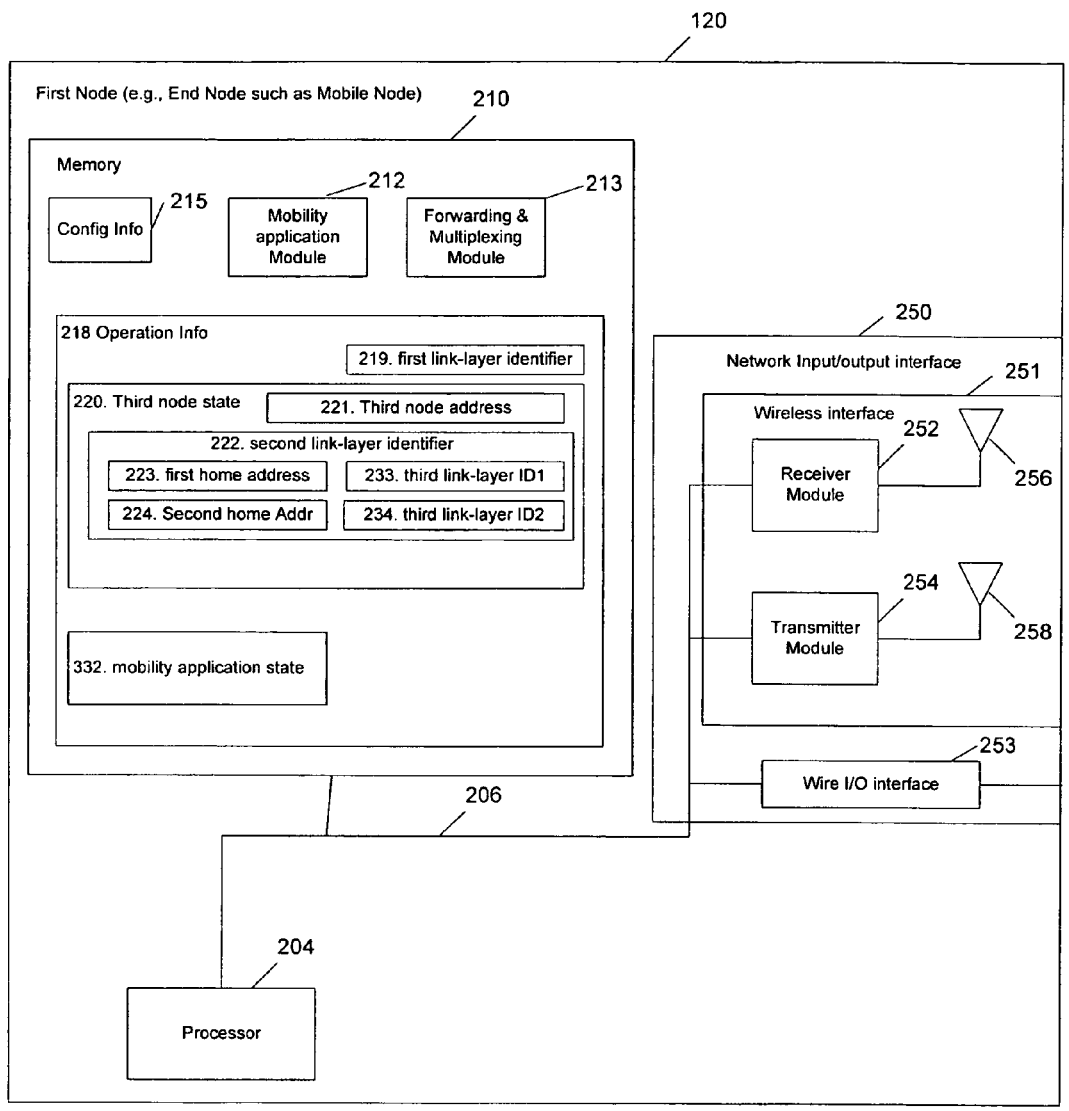
FIG. 2 illustrates an exemplary first node, e.g., an exemplary end node such as an exemplary Mobile Node, implemented in accordance with the present invention and using methods of the present invention.

FIG. 2 shows the exemplary first node, e.g., end node such as a mobile node, 120 of the invention implemented in accordance with the invention. Exemplary first node 120 includes a network input/output interface 250 used for coupling the first node 120 to the second node 130, a communications bus 206 coupling the network input/output interface 250 to a processor 204 and a memory 210. Network input/output interface 250 may include wireless and/or wire interfaces (251, 253), and in the former case has a receiver module 252 coupled to a receiver antenna 256 and a transmitter module 254 coupled to a transmitter antenna 258. The memory 210 includes configuration information 215, a mobility application module 212, a forwarding and multiplexing module 213 and operation information 218. Processor 204, e.g., a CPU, operates the various modules according to the configuration information 215, the operation information 218 and packet information that is received and transmitted via the network input/output interface 250. The mobility application module 212 employs signaling to maintain the mobility forwarding state in the first node 120, second node 130, third node 140 and the optional fourth node 150. The mobile application module 212 generates upstream application packets which are sent to the forwarding and multiplexing module 213 where each packet is multiplexed into one or more link-layer frames. The forwarding and multiplexing module 213 receives downstream link-layer frames from the network input/output interface 250 and demultiplexes one or more frames to create a received downstream packet which is then forwarded to the mobile application module 212. The mobile application module 212 has a process associated with packets that employ the first home address 223 and a process associated with packets that employ the second home address 224. The operation information 218 includes mobility application state 332 such as packet information to be transmitted and that which has been received at the first node 120. The operation information 218 further includes state that is either populated from the configuration information 215 or is learnt from the second node 130, third node 140 and/or the optional fourth node 150 as a result of mobility application signaling conducted by the mobility application module 212. Operation information 218 includes first link-layer identifier 219 and third node state 220. The first link-layer identifier 219 is known by the first node 120 and the second node 130 to be the current link-layer identifier of the first node 120 on the access link 101. Third node state 220 includes third node address 221 and second link-layer identifier 222. The third node address 221 is the address of the third node 140. Second link-layer identifier 222 includes a first home address 223, a second home address 224, a third link-layer ID1 223 and a third link-layer ID2 234. The second link-layer identifier 222 is agreed with the second node 130 to be the identifier that is associated with the forwarding state in the second node 130 for a first home address 223 and an optional second home address 224 that are from an addressing domain of the third node 140. The third link-layer identifiers and identifier 2 233, 234 are further agreed with the second node 130 to be the third link-layer identifiers that indicate that a link-layer frame contains a packet portion that is associated with the first home address 223 and second home address 224 respectively.

Figure 3:
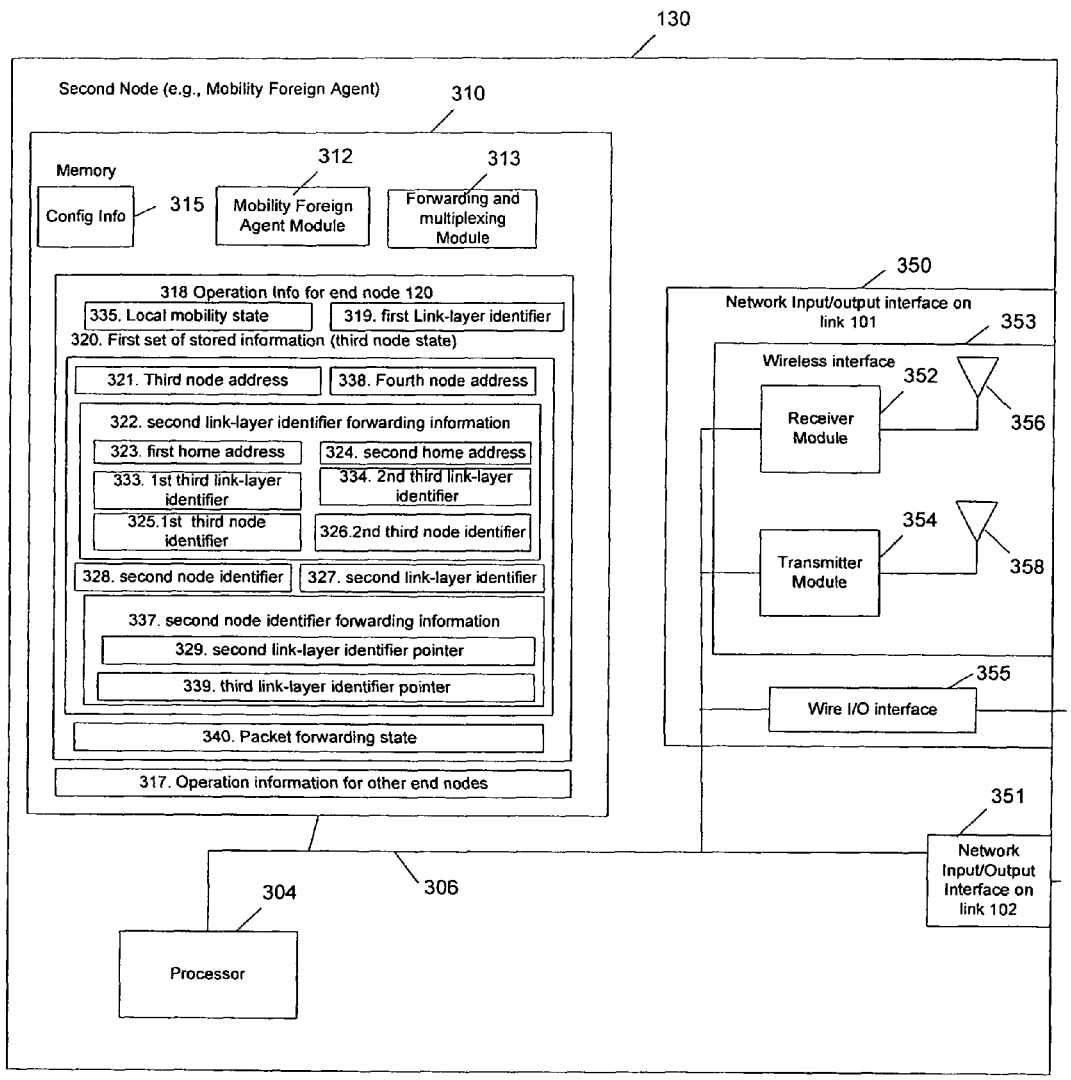
FIG. 3 illustrates an exemplary second node, e.g., a mobility foreign agent, implemented in accordance with the present invention and using methods of the present invention.

FIG. 3 shows the exemplary second node, e.g., mobility foreign agent, 130 of the invention implemented in accordance with the invention. Exemplary second node 130 includes a network input/output interface 350 used for coupling the second node 130 to the first node 120, e.g., via link 101, a network input/output interface 351 used for coupling the second node 120 to other network nodes, e.g., via link 102, a processor 304 and a memory 310. The various elements 350, 351, 304, and 310 are coupled together via bus 306 over which the various elements may interchange data and information. Network input/output interface 350 on link 101 may include wireless and/or wire interfaces (353, 355), and in the former case has a receiver module 352 coupled to a receiver antenna 356 and a transmitter module 354 coupled to a transmitter antenna 358. Network Input/Output Interface on link 102 351 may include wireless and/or wired interfaces and serves as the interface into the core network towards the third and fourth nodes 140,150.

The memory 310 includes configuration information 315, a mobility Foreign Agent module 312, a forwarding and multiplexing module 313 and operation information 318 for the first node 120 as well as operation information 317 for other nodes similar to the first node 120 directly coupled to the second node 130. Processor 304 operates the various modules according to the configuration information 315, the operation information 318 and packet information that is received and transmitted via the network input/output interfaces 350, 351 that are associated with the first node 120 and the network node 104. The mobility foreign agent module 312 employs signaling to maintain the mobility forwarding state in the first node 120, second node 130, third node 140 and the optional fourth node 150. The forwarding and multiplexing module 313 receives upstream packets from the first node 120 and creates upstream redirecting packets under control of the mobility foreign agent module 312 which are forwarded towards the third node 140. The forwarding and multiplexing module 313 receives downstream redirecting packets from the third or fourth node 140, 150 and under the control of the mobility foreign agent module 312 recovers the redirected packets which are then forwarded to the first node 120 in link-layer frames. The operation information 318 includes packet forwarding state 340 such as packet information to be transmitted and that which has been received at the second node 130, and local mobility state 335 associated with the mobility foreign agent module 312. The operation information 318 further includes state that is either populated from the configuration information 315 or is learnt from the first node 120, third node 140 and/or the optional fourth node 150 as a result of mobility signaling conducted by the mobility foreign agent module 312 for flows associated with the first node 120. Operation info 318 also includes a first link layer identifier 319. The first link-layer identifier 319 is known by the first node 120 and the second node 130 via mobility state 332, 335 to be the current link-layer identifier of the first node 120 on the access link 101. The operation information 318 also includes a first set of stored information 320 that supports the forwarding of packets between the first node 120 and the third node 140.

First set of store information (third node state) 320 includes a third node address 321, a fourth node address 338, second link-layer identifier forwarding information 322, second node identifier 328, second link layer identifier 327, and second node identifier forwarding information 337. Second link-layer identifier forwarding information includes a first home address 323, a second home address 324, a $1^{st}$ third-link layer identifier 333, a second third link-layer identifier 334, a $1^{st}$ third node identifier 325, and a second third node identifier 326. Second node identifier forwarding information 337 includes second link-layer identifier pointer 329 and third link-layer identifier pointer 339.

The third node address 321 is the address of the third node 140 and the fourth node address 338 is the address of the optional fourth node 150. The second link-layer identifier 327 is agreed with the first node 120 to be the identifier that is associated with the forwarding state in the second node 130 for a first home address 323 and an optional second home address 324 that are allocated to the first node 120 from an addressing domain of the third node 140. Associated with the second link-layer identifier 327 is the second link-layer identifier forwarding information 322. Forwarding information 322 includes a $1^{st}$ and $2^{nd}$ third link-layer identifier 333, 334 that are also known to the first node 120 to be the third link-layer identifiers that indicate that a link-layer frame contains a packet portion that is associated with the first home address 323 and second home address 324 respectively. When the first node 120 has multiple home addresses from the same addressing domain of the third node 140, then if a third link layer identifier is stored in the second node 130 then the second node 130 can omit storing the home address information that is associated with said link-layer identifier for forwarding purposes which is particularly advantages when the first node 120 needs to perform link-layer forwarding. Associated with each of the third link-layer identifiers 333, 334 and the home addresses 323, 324 is a $1^{st}$ and $2^{nd}$ third node identifier 325, 326 to be included in redirecting packets towards the third or fourth nodes 140,150. The $1^{st}$ and $2^{nd}$ third node identifiers 325, 326 may be the same value, or may be different for redirecting packets that are associated with the first and the second home addresses. The $1^{st}$ third link-layer identifier 333 may be included in redirecting packets with a $1^{st}$ third node identifier 325 to enable discrimination between redirecting packets associated with the first and the second home addresses 323, 324, when the $1^{st}$ and $2^{nd}$ third node identifiers 325, 326 have the same value. The second node identifier 328 is agreed with the third or fourth node 140, 150 to be the identifier that is associated with the forwarding state in the second node 130 for a first home address 323 and an optional second home address 324 that are allocated to the first node 120 from a specific addressing domain of the third node 140. Associated with the second node identifier 328 is forwarding information 337 that identifies the associated second link-layer identifier 327 via second link-layer identifier pointer 329, and that identifies one of the $1^{st}$ and $2^{nd}$ third link-layer identifiers 333, 334 that is expected in the redirected packet via the optional third link-layer identifier pointer 339. If the optional third link layer identifier is not included in the received redirecting packet then one of the $1^{st}$ and $2^{nd}$ third link-layer identifiers can be determined from home addresses 323, 324 in information 322 by comparison with the home address value in the destination address of the redirected packet.

Figure 4:
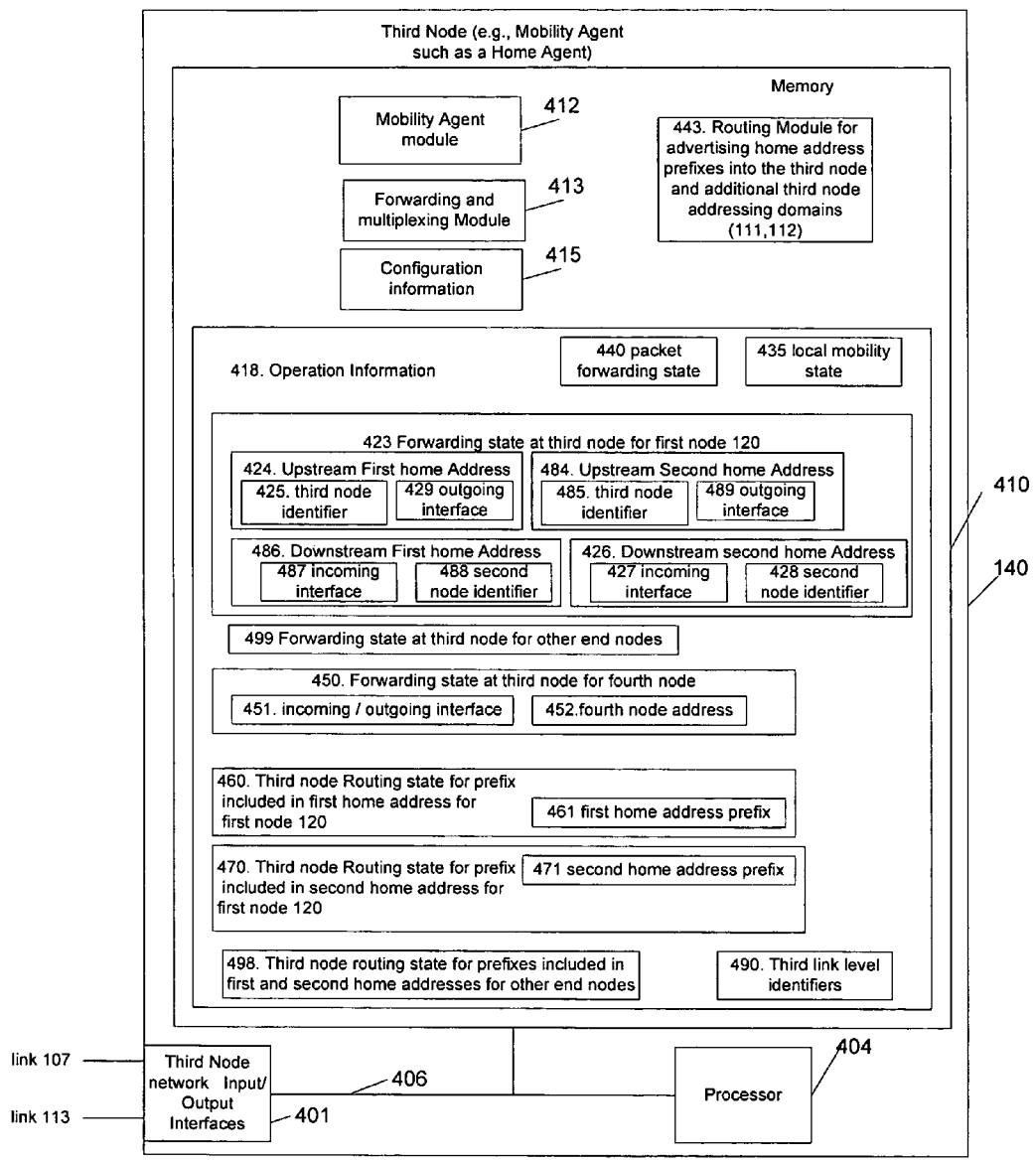
FIG. 4 illustrates an exemplary third node, e.g., a Mobility Agent such as a Home Agent, implemented in accordance with the present invention and using methods of the present invention.

FIG. 4 shows the exemplary third node, e.g., mobility agent such as a Home Agent, 140 of the invention implemented in accordance with the invention. Exemplary third node 140 includes a communications bus 406 coupling network input/output interfaces 401 to a processor 404 and a memory 310. The Network input/output interfaces 401 in the third node 140 are coupled to the link 107 and the link 113 in the third node addressing domain 111 and the additional third node addressing domain 112. The Network interfaces 401 may include wireless and/or wire interfaces. The memory 410 includes configuration information 415, a Mobility Agent module 412, a forwarding and multiplexing module 413, a routing module 443, and operation information 418. Processor 404 operates the various modules according to the configuration information 415, the operation information 418 and packet information that is received and transmitted via the network input/output interfaces 401 that is associated with the first node 120. The mobility home agent module 412 employs signaling to maintain the mobility forwarding state in the first node 120, second node 130, third node 140 and the optional fourth node 150. The forwarding and multiplexing module 413 receives upstream redirecting packets and creates downstream redirecting packets under control of the mobility agent module 412. The operation information 418 includes packet forwarding state 440 such as packet information to be transmitted and that which has been received, and local mobility state 435 associated with the mobility agent module 412. The operation information 418 further includes state that is either populated from the configuration information 415 or is learnt from the first node 120, second node 130, third node 140 and/or the optional fourth node 150 as a result of mobility signaling conducted by the mobility agent module 412 for flows associated with the first node 120.

The third node 140 stores in operation information 418 forwarding state 423 for the first node 120 and forwarding state information 499 for other end nodes. Forwarding state 423 at third node 140 for first node 120 includes: upstream forwarding state 424 for the first home address, downstream forwarding state 486 for the first home address, upstream forwarding state 484 for the second home address, and downstream forwarding state 426 for the second home address. Upstream forwarding state 424 for the first home address includes the associated third node identifier 425 to be received in redirecting packets, and the associated outgoing interface 429 towards which the recovered redirected packet is to be forwarded. Downstream forwarding state 486 for the first home address includes the associated incoming interface 487 over which packets are received that are associated with the first home address and are to be redirected, and the associated second node identifier 488 which is to be included in said redirected packets associated with said first home address. Upstream forwarding state 484 for the second home address includes the associated third node identifier 485 to be received in redirecting packets, and the associated outgoing interface 489 towards which the recovered redirected packet is to be forwarded. Downstream forwarding state 426 for the second home address includes the associated incoming interface 427 over which packets are received, that are associated with the second home address and are to be redirected, and the associated second node identifier 428 which is to be included in said redirected packets associated with the second home address.

Operation information 418 in the third node 140 also includes forwarding state 450 for the fourth node 150 which includes; the incoming and outgoing interface 451 at the third node 140 and the associated fourth node address 452 to and from which redirecting packets are to be forwarded.

Operation information 418 further includes routing state 460, 470 in the third node 140 for the prefixes that are included in the first home address and the second home address of the first node 120. Third node routing state 460 for prefix included in first home address of the first node 120 includes first home address prefix 461. Third node routing state for prefix included in second home address for first node 120 includes second home address prefix 471. Operation information 418 further includes third node routing state for prefix included in first and second home addresses for additional end nodes 498. Each prefix is advertised by the routing module 443 in the third node 140 into one of the third node addressing domain 111 and the additional third node addressing domain 112. Operation information 418 also includes, in some embodiments, third link-layer identifier 490 that is optionally included in redirecting packets.

Figure 5:
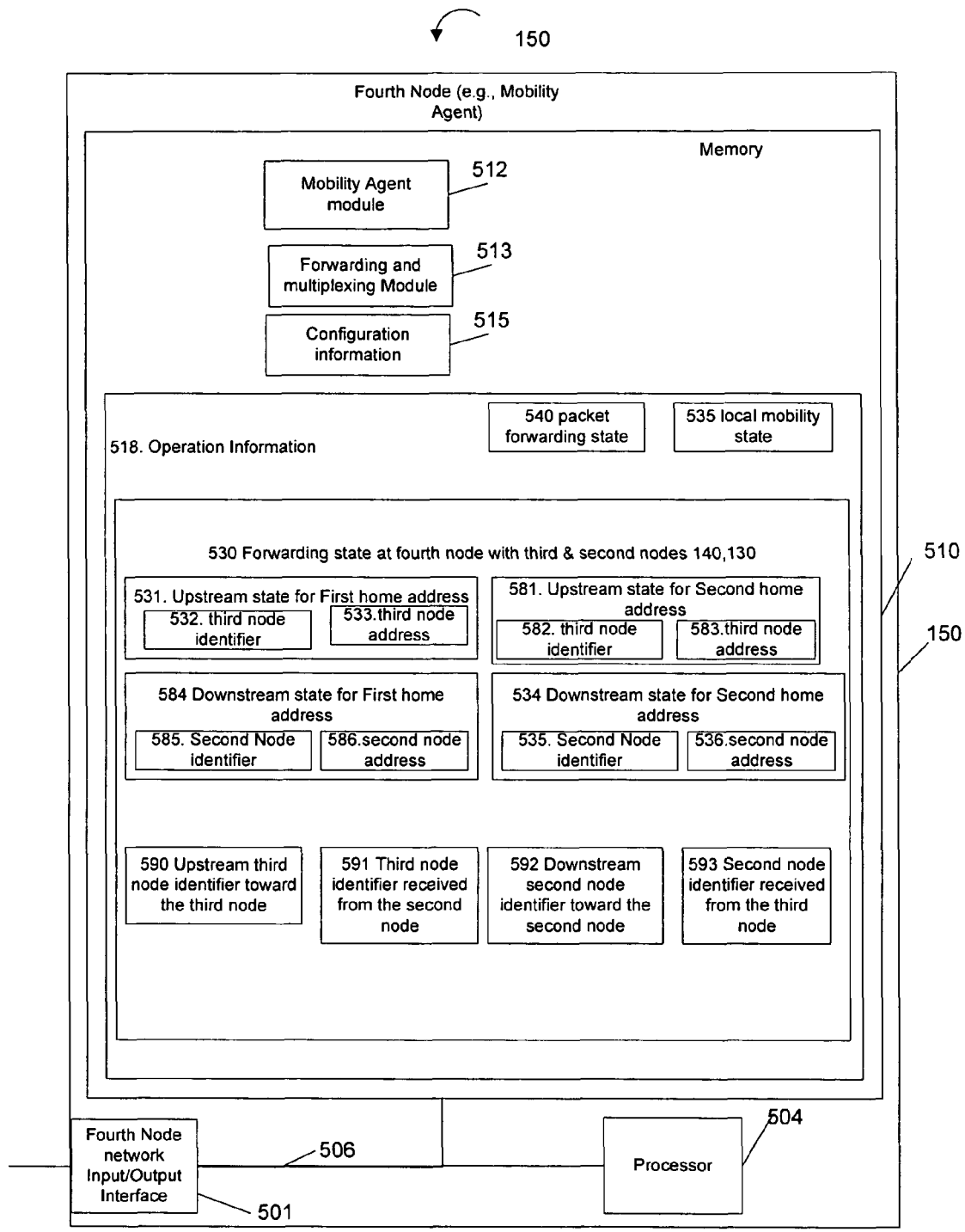
FIG. 5 illustrates an exemplary fourth node, e.g., a Mobility Agent, implemented in accordance with the present invention and using methods of the present invention.

FIG. 5 shows the exemplary fourth node, e.g., mobility agent, 150 of the invention implemented in accordance with the invention. Exemplary fourth node 150 includes a communications bus 506 coupling network input/output interfaces 501 to a processor 504 and a memory 510. The Network input/output interfaces 501 in the fourth node 150 are coupled to the link 103' in the first addressing domain 110. Network interfaces 501 may include wireless and/or wire interfaces. The memory 510 includes configuration information 515, a Mobility Agent module 512, a forwarding and multiplexing module 513 and operation information 518. Processor 504 operates the various modules according to the configuration information 515, the operation information 518 and packet information that is received and transmitted via the network input/output interfaces 501 that is associated with the first node 120. The mobility home agent module 512 employs signaling to maintain the mobility forwarding state in the first node 120, second node 130, and third node 140. The forwarding and multiplexing module 513 receives upstream redirecting packets and creates downstream redirecting packets under control of the mobility agent module 512. The operation information 518 includes packet forwarding state 540 such as packet information to be transmitted and that which has been received, and local mobility state 535 associated with the mobility agent module 512. The operation information 518 further includes state that is either populated from the configuration information 515 or is learnt from the first node 120, second node 130, and/or third node 140 as a result of mobility signaling conducted by the mobility agent module 512 for flows associated with the first node 120.

Operation information 518 in the fourth node 150 also includes forwarding state 530 at fourth node 150 with the second and third nodes 130,140. Forwarding state 530 includes: upstream state 531 for the first home address, downstream state 584 for first home address, upstream state 581 for second home address, and downstream state 534 for second home address. Upstream state 531 for first home address includes third node identifier 532 included in upstream redirecting packets associated with the first home address from the second node 130 that maps to the third node address 533 towards which redirecting packets are forwarded. Downstream state 584 for first home address includes the second node identifier 585 to be received in downstream redirecting packets associated with the first home address from the third node 140 that maps to the second node address 586 towards which redirecting packets are to be forwarded.

Upstream state 581 for second home address includes third node identifier 582 included in upstream redirecting packets associated with the second home address from the second node 130 that maps to the third node address 583 towards which redirecting packets are forwarded. Downstream state 534 for second home address includes the second node identifier 535 to be received in downstream redirecting packets associated with the second home address from the third node 140 that maps to the second node address 536 towards which redirecting packets are to be forwarded.

In some embodiments using an alternative forwarding embodiment in the case of the fourth node 150, state information 530 includes an upstream third node identifier 590 towards the third node 140 that is different from, but mapped to, the third node identifier 491 received from the second node 130 (e.g., the fourth node performs third node identifier switching), and a downstream second node identifier 592 towards the second node 130 that is different from, but mapped to, the second node identifier 593 received from the third node 140 (e.g., the fourth node performs second node identifier switching). It should also be clear that whilst upstream redirecting packet forwarding employs the third node identifier, and downstream redirecting packet forwarding employs the second node identifier, that the values of the multiplexing information in the third and second node identifiers for a specific packet flow between a first node 120 and a third node interface and/or addressing domain may be the same.

Figure 6B:
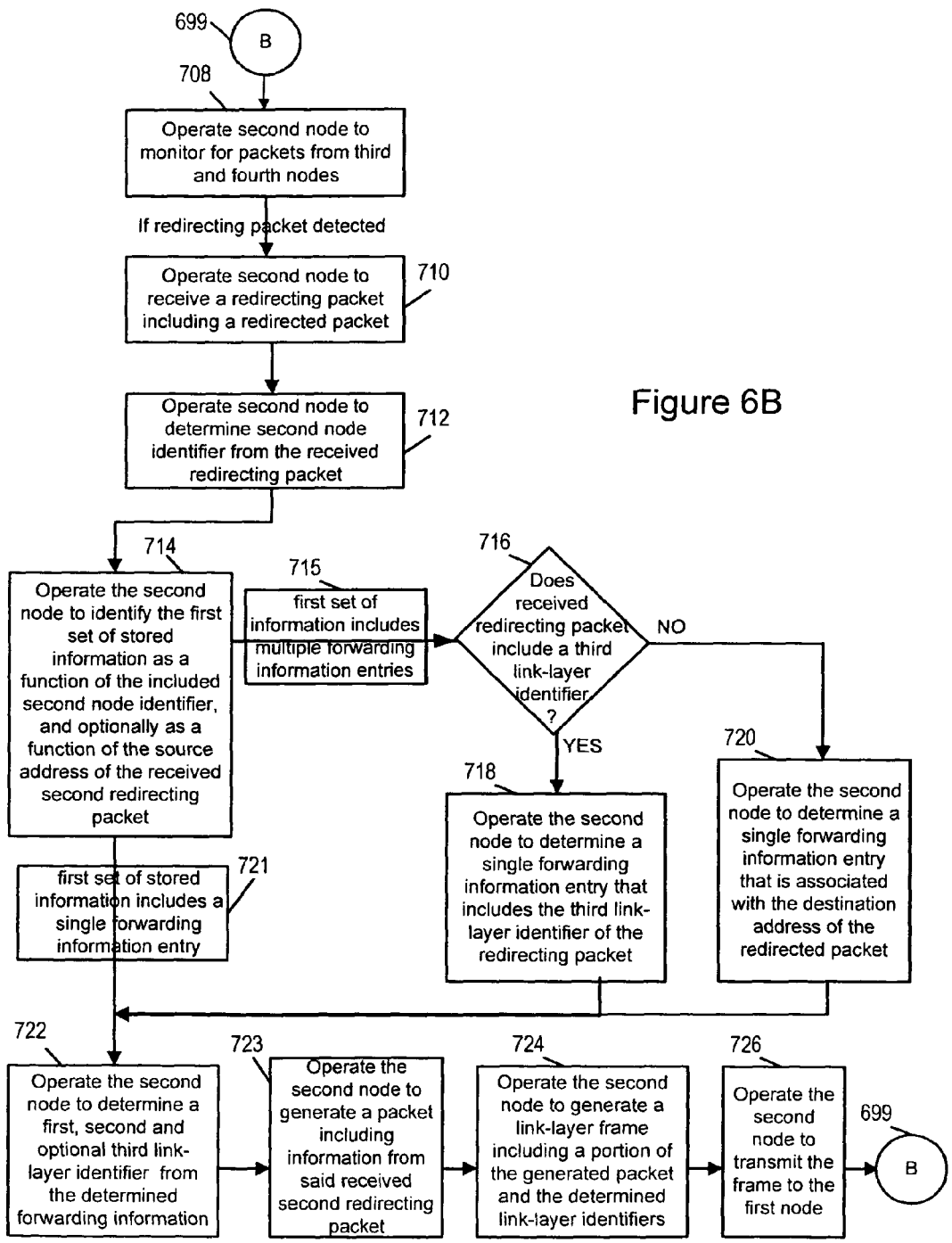
FIG. 6 comprising the combination of FIGS. 6A and 6B is a flowchart illustrating an exemplary communications method that is performed in accordance with the invention for receiving and processing link-layer frames and packets at the second node from the first node and for receiving redirecting packets at the second node from the third and/or fourth nodes.

FIG. 6, comprising the combination of FIG. 6A and FIG. 6B, is a flowchart 700 illustrating exemplary methods of the invention undertaken by operating the second node 130. In FIG. 6A, the method starts at step 600 where the processing moves to step 601 where the network nodes in the first addressing domain 110, the third node addressing domain 111 and the additional third node addressing domain 112 are initialized, including the second node 130. In step 602, the communication couplings between the second node 130, and the first, third and fourth nodes 120, 140, 150 are initialized including the storage of the first, second and third link-layer identifiers, the second and third node identifiers and the addresses of the first, third and fourth nodes 120, 140, 150 to be used for exchanging communication frames and packets with the second node 130. The method moves through connecting node A 603 to step 604, where the second node 130 is operated to monitor for frames from the first node 120. If a frame is received that includes a first packet portion, operation proceeds from step 604 to step 606. In step 606 the second node 130 is operated to receive a frame including the first packet portion of a packet, rather than a frame including a remaining portion of said packet, said first packet portion including part of the packet header. The received frame from step 606 includes first and second link level identifiers. In step 608, the second node 130 is operated to determine a first set of stored information that is associated with the first and second link-layer identifiers from the received frame. If the first set of stored information includes multiple forwarding information entries 609, then operation proceeds from step 608 to step 610. However, if the first set of stored information includes a single forwarding entry 611, then operation proceeds from step 608 to step 616. If in step 610, the received frame includes an optional third link-layer identifier then operation proceeds to step 612. In step 612, the second node 130 is operated to determine one of multiple forwarding information entries, which includes said third link layer identifier of the received frame. If in step 610, the received frame does not include an optional third link-layer identifier then operation proceeds from step 610 to step 614. In step 614, the second node 130 is operated to determine one of multiple forwarding information entries, which includes the source address of the received packet which includes the home address. Having identified a single forwarding information entry in either step 612, step 614 or step 608, operation proceeds to step 616. In step 616 the second node 130 is operated to determine a third node identifier and the address of an upstream node from the determined single forwarding information entry. Next, in step

618, the second node 130 is operated to generate a redirecting packet as a function of said determined forwarding information, said redirecting packet including information from the received first packet portion and optionally including a third link layer identifier that was identified in step 610. Operation proceeds from step 618 to step 620. In step 620, the second node 130 is operated to transmit the generated redirecting packet to the address of the upstream node, said upstream node being one of the third node 140 or the fourth node 150, and the method returns via connecting node A 603 to step 604 to await the reception of additional frames that contain a first packet portion.

Returning to step 602, the method further moves via connecting node B 699 to step 708 from which the method is further described with respect to FIG. 6B.

In FIG. 6B, the method continues from connecting node B 699 to step 708 where the second node 130 is operated to monitor for packets from the third or fourth nodes 140, 150. In step 710, the second node 130 is operated to receive a redirecting packet including a redirected packet. In step 712, the second node 130 is operated to determine the second node identifier from the received redirecting packet. In step 714 the second node 130 is operated to identify the first set of stored information as a function of the second node identifier included in the received second redirected packet, and optionally as a function of the source address of the received second redirected packet. If the first set of stored information includes multiple forwarding information entries 715 operation proceeds from step 714 to step 716; however, if the first set of stored information includes a single forwarding entry 721, then operation proceeds from step 714 to step 722. If in step 716, the received redirecting packet includes an optional third link-layer identifier, then operation proceeds from step 716 to step 718. In step 718, the second node 130 is operated to determine one of multiple forwarding information entries, which includes said third link layer identifier of the redirecting packet. If in step 716, the received redirecting packet does not include an optional third link-layer identifier, then operation proceeds from step 716 to step 720. In step 720, the second node 130 is operated to determine one of multiple forwarding information entries that includes the destination address of the redirected packet within the received redirecting packet, which includes the home address. Having identified a single forwarding information entry, operations proceed from step 714, 718, or step 720 to step 722. In step 722 the second node 130 is operated to determine a first, second and optional third link-layer identifier from the determined forwarding information. Next in step 723, the second node 130 is operated to generate a packet including information from said received second redirected packet. Next, in step 724, the second node 130 is operated to generate a link-layer frame, including a portion of the generated packet and further including the determined link-layer identifiers. Finally, in step 726, the second node 130 is operated to transmit the generated link-layer frame to the first node 120 that is associated with the first link-layer identifier included in said link-layer frame and the method then returns via connecting node B 699 to step 708 to monitor for additional packets from either the third or fourth nodes 140, 150.

In summary, the novel link-layer identifiers on the access link provide link-layer separation of packet flows, and this separation is mapped at the second node 130 into either a link-layer or IP layer separation of flows, identified by the second and third node identifiers between the second node 130 and the specific addressing domain/interface at the third node 140. This establishes a virtual private network between the first node 120 and each unique addressing domain and/or interface at the third node 140. When the fourth node 150 is located between the second and third nodes 130, 140 then the VPN state should be maintained across the fourth node 150 either by making the second and third node identifiers unique and unchanged through the fourth node 150 or by employing different second, third node identifiers across the links to the second and the third nodes 130,140, and then having mapping state in the fourth node 150 which maps between the different second, third node identifiers on each link as a packet flow traverses the fourth node 150. The VPN identifiers and forwarding state are different for each interface/addressing domain of the third node 140. They can also be different for each first node 120 at a specific second node 130, different for each second node 130 but common to each of the directly connected end nodes at that second node, or the same for each of the end nodes on any second node 130 that is coupled to the third node 140. The VPN state includes information that the VPN can use to identify and successfully deliver packets without having to track the combination of the home address, the third node address and the addressing domain at the third node which when combined will define a globally unique address even when the home address is a private or otherwise globally non-unique address.

The invention supports methods other than IP in IP tunnels for packet redirection between the second node 130 and the third 140 or fourth node 150; said methods including for example, IPv7 Flow identifier, IPv6 (Internet Protocol Version 6) routing headers, GRE (Generic Routing Encapsulation) tunnels, IPSEC tunnels, as well as VPN (Virtual Private Network) techniques such as MPLS (Multi Protocol Label Switching) and switched circuits.

Whilst the invention has been described for exemplary MIP based packet redirection and forwarding, the invention is applicable to other mobility schemes that employ mobility forwarding state that needs to be unique for multiple flows that traverse an access link for a MN and when the MN can use concurrent addresses from overlapping address pools that are allocated from one or more core nodes.

Messages may be stored in a physical machine readable medium such as a hard disk, memory or other storage device as a collection of bits located as a unit in said machine readable medium. Fields within said messages may be stored as adjacent sets of bits in the storage medium. Messages generated and communicated in accordance with the invention are stored, e.g., temporarily, in buffers and/or other memory implemented as a physical machine readable medium used to store the message. Messages are stored, e.g., buffered in machine readable medium included in nodes through which the messages are passed and/or in each node that generates or receives a message. Software modules may also be stored in the physical machine readable memory.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s). Messages which are generated and/or transmitted in accordance with the invention are stored on machine readable medium, e.g., in memory (RAM) in the device generating, transmitting and/or receiving the message or messages. The present invention is directed to, among other things, memory storing the novel messages of the present invention.

Numerous additional variations on the methods and apparatus of the present invention described above will be apparent to those skilled in the art in view of the above description of the invention. Such variations are to be considered within the scope of the invention. The methods and apparatus of the present invention may be used with CDMA, orthogonal frequency division multiplexing (OFDM), or various other types of communications techniques which may be used to provide wireless communications links between access nodes such as base stations, access routers and mobile nodes. Accordingly, in some embodiments base stations establish communications links with mobile nodes using OFDM or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. An apparatus for forwarding link-layer frame information to a third node, comprising:
    a circuitry comprising functional modules, a memory, and a processor;
    the circuitry configured to receive, from a first node in a first addressing domain, a link-layer frame comprising a first packet portion, a first link layer identifier and a second link-layer identifier that uniquely identifies the third node, the circuitry being further configured to identify a first set of stored information with forwarding information for the first packet portion based on the first and second link-layer identifiers, wherein the forwarding information comprises a third node identifier and a third node address, wherein the third node identifier identifies one of multiple addressing domains of the third node, the circuitry being further configured to generate a first redirecting packet with header information from the first packet portion and the identified third node identifier and transmit the first redirecting packet towards the third node identified by the third node address, wherein the first node and the apparatus are located in the first addressing domain, wherein the first node has a first home address that includes an address prefix corresponding to an addressing domain of the third node, wherein the prefix is included in a first routing advertisement that is transmitted by the third node, wherein the first routing advertisement being associated with a routing system that includes the addressing domain of the third node, and wherein the third node is a mobile Internet Protocol home agent using the routing system that supports at least two addressing domains.

2. The apparatus of claim 1, wherein the first node is a mobile node, the apparatus is a mobile Internet protocol foreign agent and the third node address is in the third node identifier.

3. The apparatus of claim 1, wherein the third node identifier is in one of the first and second link-layer identifiers.

4. The apparatus of claim 3, wherein the first and second link-layer identifiers are link-layer addresses that indicate one of at least a source address, destination address or connection address in the link-layer frame.

5. The apparatus of claim 1, wherein the first node has a second home address with an address prefix corresponding to an additional addressing domain of the third node, wherein the prefix corresponding to an additional addressing domain of the third node is included in a second routing advertisement that is transmitted by the third node, wherein the second routing advertisement is associated with the routing system of the additional addressing domain of the third node, wherein the first set of stored information includes a single third node identifier and does not include the second home address.

6. The apparatus of claim 5, wherein the first set of stored information comprises a first forwarding information entry for the first home address and a second forwarding information entry for the second home address.

7. The apparatus of claim 6, wherein the first forwarding entry comprises the third node identifier and the second forwarding entry comprises an additional third node identifier.

8. The apparatus of claim 6, wherein the circuitry configured to identify is further configured to:
    select the first forwarding information entry when the received first packet portion includes the first home address; and
    select the second forwarding information entry when the received first packet portion includes the second home address.

9. The apparatus of claim 6, wherein the first forwarding information entry further comprises a first third link-layer identifier and the second forwarding information entry further comprises a second third link-layer identifier; and wherein the received link-layer frame further comprises a received third link-layer identifier; and
    wherein the circuitry configured to identify is further configured to:
    select the first forwarding information entry when the received third link-layer identifier matches the first third link-layer identifier; and
    select the second forwarding information entry when the received third link-layer identifier matches the second third link-layer identifier.

10. The apparatus of claim 1, wherein the addressing domains of the third node is different from the first addressing domain.

11. The apparatus of claim 10, wherein the circuitry is further configured to:
    store a fourth node address information on the apparatus, wherein the fourth node is located between the apparatus and third node and uses an interface identified by the fourth node address;
    wherein the circuitry configured to generate the first redirecting packet is further configured to:
    use the fourth node address information to generate a destination address for the first redirecting packet; and
    transmit the first redirecting packet to the fourth node.

12. The apparatus of claim 11, wherein an addressing domain of the fourth node is the first addressing domain.

13. The apparatus of claim 11, wherein the addressing domain of the fourth node is the addressing domain of the third node.

14. The apparatus of claim 11, wherein the third node identifier is equal to the fourth node address.

15. The apparatus of claim 11, wherein the third node identifier that indicates the addressing domain of the third node, is in addition to a source and destination address that are also included in the first redirecting packet.

16. The apparatus of claim 15, wherein the third node identifier is not an address and is one of: an Internet protocol security parameter index, a layer two channeling protocol channel identifier, and a generic router encapsulation key.

17. The apparatus of claim 15, wherein the third node identifier is not an address and is one of: a multi-protocol label switching label, a transmission control protocol port and a user datagram protocol port.

18. The apparatus of claim 15, wherein the third node identifier is one of: an Internet protocol extension header and an Internet protocol flow identifier.

19. The apparatus of claim 11, wherein the apparatus further comprises a second node identifier, wherein the circuitry is further configured to:
receive a second redirecting packet, the second redirecting packet including the second node identifier;
identify the forwarding information in the first set of stored information comprising the first and second link-layer identifiers based on the second node identifier;
generate a packet that includes information from the received second redirecting packet;
generate a link-layer frame that includes a portion of the generated packet and the first and second link-layer identifiers; and
forward the generated link-layer frame to the first node.

20. The apparatus of claim 19, wherein the circuitry configured to identify is also based on a source address of the received second redirecting packet, wherein the source address is the third node address or the fourth node address.

21. The apparatus of claim 19, wherein the first set of stored information comprises multiple forwarding entries, the circuitry is further configured to:
determine forwarding information from the multiple forwarding entries using additional information included in the received second redirecting packet, the additional information being one of: the first home address and the third link-layer identifier.

22. The apparatus of claim 21, wherein the circuitry configured to generate the link-layer frame is further configured to include the third link-layer identifier in the generated frame, the third link-layer identifier being obtained from one of: the determined forwarding information and the received second redirecting packet.

23. A method for forwarding link-layer frame information by a second node to a third node, comprising:
receiving, from a first node in a first addressing domain, a link-layer frame comprising a first packet portion, a first link layer identifier and a second link-layer identifier that uniquely identifies the third node;
identifying a first set of stored information with forwarding information for the first packet portion based on the first and second link-layer identifiers, wherein the forwarding information comprises a third node identifier and a third node address, wherein the third node identifier identifies one of multiple addressing domains of the third node;
generating a first redirecting packet with header information from the first packet portion and the identified third node identifier; and
transmitting the first redirecting packet towards the third node identified by the third node address, wherein the first and second nodes are located in the first addressing domain, wherein the first node has a first home address that includes an address prefix corresponding to an addressing domain of the third node, wherein the prefix is included in a first routing advertisement that is transmitted by the third node, wherein the first routing advertisement is associated with a routing system that includes the addressing domain of the third node, and wherein the third node is a mobile Internet protocol home agent using the routing system that supports at least two addressing domains.

24. The method of claim 23, wherein the first node is a mobile node, the second node is a mobile Internet protocol foreign agent and the third node address is in the third node identifier.

25. The method of claim 23, wherein the third node identifier is in one of the first and second link-layer identifiers.

26. The method of claim 25, wherein the first and second link-layer identifiers are link-layer addresses that indicate one of at least a source address, destination address or connection address in the link-layer frame.

27. The method of claim 23, wherein the first node has a second home address with an address prefix corresponding to an additional addressing domain of the third node, wherein the prefix corresponding to an additional addressing domain of the third node is included in a second routing advertisement that is transmitted by the third node, wherein the second routing advertisement is associated with the routing system of the additional addressing domain of the third node, and wherein the first set of stored information includes a single third node identifier and does not include the second home address.

28. The method of claim 27, wherein the first set of stored information comprises a first forwarding information entry for the first home address and a second forwarding information entry for the second home address.

29. The method of claim 28, wherein the first forwarding entry comprises the third node identifier and the second forwarding entry comprises an additional third node identifier.

30. The method of claim 28, wherein the identifying comprises:
selecting the first forwarding information entry when the received first packet portion includes the first home address; and
selecting the second forwarding information entry when the received first packet portion includes the second home address.

31. The method of claim 28, wherein:
the first forwarding information entry further comprises a first third link-layer identifier and the second forwarding information entry further comprises a second third link-layer identifier;
the received link-layer frame further comprises a received third link-layer identifier; and
the identifying comprises selecting the first forwarding information entry when the received third link-layer identifier matches the first third link-layer identifier, and selecting the second forwarding information entry when the received third link-layer identifier matches the second third link-layer identifier.

32. The method of claim 23, wherein the addressing domains of the third node is different from the first addressing domain.

33. The method of claim 32, further comprising storing a fourth node address information on the second node, and wherein:
the fourth node is located between the second node and third node and uses an interface identified by the fourth node address; and
the generating the first redirecting packet comprises using the fourth node address information to generate a destination address for the first redirecting packet, and transmitting the first redirecting packet to the fourth node.

34. The method of claim 33, wherein an addressing domain of the fourth node is the first addressing domain.

35. The method of claim 33, wherein the addressing domain of the fourth node is the addressing domain of the third node.

36. The method of claim 33, wherein the third node identifier is equal to the fourth node address.

37. The method of claim 33, wherein the third node identifier that indicates the addressing domain of the third node is in addition to a source and destination address that are also included in the first redirecting packet.

38. The method of claim 37, wherein the third node identifier is not an address and is one of: an Internet protocol security parameter index, a layer two channeling protocol channel identifier and a generic router encapsulation key.

39. The method of claim 37, wherein the third node identifier is not an address and is one of: a multi-protocol label switching label, a transmission control protocol port and a user datagram protocol port.

40. The method of claim 37, wherein the third node identifier is one of: an Internet protocol extension header and an Internet protocol flow identifier.

41. The method of claim 33, wherein the second node further includes a second node identifier, the method further comprising:
receiving a second redirecting packet, the second redirecting packet including the second node identifier;
identifying the forwarding information in the first set of stored information comprising the first and second link-layer identifiers based on the second node identifier;
generating a packet that includes information from the received second redirecting packet;
generating a link-layer frame that includes a portion of the generated packet and the first and second link-layer identifiers; and
forwarding the generated link-layer frame to the first node.

42. The method of claim 41, wherein the identifying is also based on a source address of the received second redirecting packet, and wherein the source address is the third node address or the fourth node address.

43. The method of claim 41, wherein the first set of stored information comprises multiple forwarding entries, the method further comprising determining forwarding information from the multiple forwarding entries using additional information included in the received second redirecting packet, the additional information being one of the first home address and the third link-layer identifier.

44. The method of claim 43, wherein the step of generating the link-layer frame comprises including the third link-layer identifier in the generated frame, the third link-layer identifier being obtained from one of the determined forwarding information and the received second redirecting packet.

45. An apparatus for forwarding link-layer frame information from a second node to a third node, comprising:
means for receiving, from a first node in a first addressing domain, a link-layer frame comprising a first packet portion, a first link layer identifier and a second link-layer identifier that uniquely identifies the third node;
means for identifying a first set of stored information with forwarding information for the first packet portion based on the first and second link-layer identifiers, wherein the forwarding information comprises a third node identifier and a third node address, wherein the third node identifier identifies one of multiple addressing domains of the third node;
means for generating a first redirecting packet with header information from the first packet portion and the identified third node identifier; and
means for transmitting the first redirecting packet towards a third node identified by the third node address, wherein the third node is a mobile Internet Protocol home agent.

46. The apparatus of claim 45, further comprising:
means for receiving a second redirecting packet, the second redirecting packet including a second node identifier;
means for identifying the forwarding information in the first set of stored information comprising the first and second link-layer identifiers based on the second node identifier;
means for generating a packet that includes information from the received second redirecting packet;
means for generating a link-layer frame that includes a portion of the generated packet and the first and second link-layer identifiers; and
means for forwarding the generated link-layer frame to the first node.

47. A computer-program product for forwarding link-layer frame information from a second node to a third node, the computer-program product comprising a non-transitory computer-readable medium having instructions thereon, the instructions comprising:
code for causing the second node to receive, from a first node in a first addressing domain, a link-layer frame comprising a first packet portion, a first link layer identifier and a second link-layer identifier that uniquely identifies the third node;
code for causing the second node to identify a first set of stored information with forwarding information for the first packet portion based on the first and second link-layer identifiers, wherein the forwarding information comprises a third node identifier and a third node address, wherein the third node identifier identifies one of multiple addressing domains of the third node;
code for causing the second node to generate a first redirecting packet with header information from the first packet portion and the identified third node identifier; and
code for causing the second node to transmit the first redirecting packet towards a third node identified by the third node address, wherein the third node is a mobile Internet Protocol home agent.

48. The computer-program product of claim 47, wherein the second node further includes a second node identifier, and wherein the instructions further comprise:
code for causing the second node to receive a second redirecting packet, the second redirecting packet including the second node identifier;
code for causing the second node to identify the forwarding information in the first set of stored information comprising the first and second link-layer identifiers based on the second node identifier;
code for causing the second node to generate a packet that includes information from the received second redirecting packet;
code for causing the second node to generate a link-layer frame that includes a portion of the generated packet and the first and second link-layer identifiers; and
code for causing the second node to forward the generated link-layer frame to the first node.

49. A first node for sending link-layer frame information to a second node for forwarding to a third node, comprising:
a circuitry comprising functional modules, a memory, and a processor;
the circuitry configured to determine a first packet portion, a first link-layer identifier that uniquely identifies the first node to the second node and a second link-layer identifier that uniquely identifies the third node to the second node, and pack the first packet portion, first link-layer identifier and second link-layer identifier in a link-layer frame, wherein the third node is a mobile Internet Protocol home agent and has multiple addressing domains, wherein the circuitry is further configured to determine a third link-layer identifier that identifies one of multiple forwarding entries in a first set of stored information on the second node, and pack the third link-layer identifier in the link-layer frame.

50. The first node of claim 49, wherein each forwarding entry is associated with a different home address of the first node.

51. A method for sending link-layer frame information from a first node to a second node for forwarding to a third node, comprising:

determining a first packet portion;

determining a first link-layer identifier that uniquely identifies the first node to the second node and a second link-layer identifier that uniquely identifies the third node to the second node, wherein the third node is a mobile Internet Protocol home agent and has multiple addressing domains;

packing the first packet portion, the first link-layer identifier and the second link-layer identifier in a link-layer frame;

determining a third link-layer identifier that identifies one of multiple forwarding entries in a first set of stored information on the second node; and packing the third link-layer identifier in the link-layer frame and sending the link-layer frame to the second node.

52. The method of claim 51, wherein each forwarding entry is associated with a different home address of the first node.

* * * * *